Figure 1:
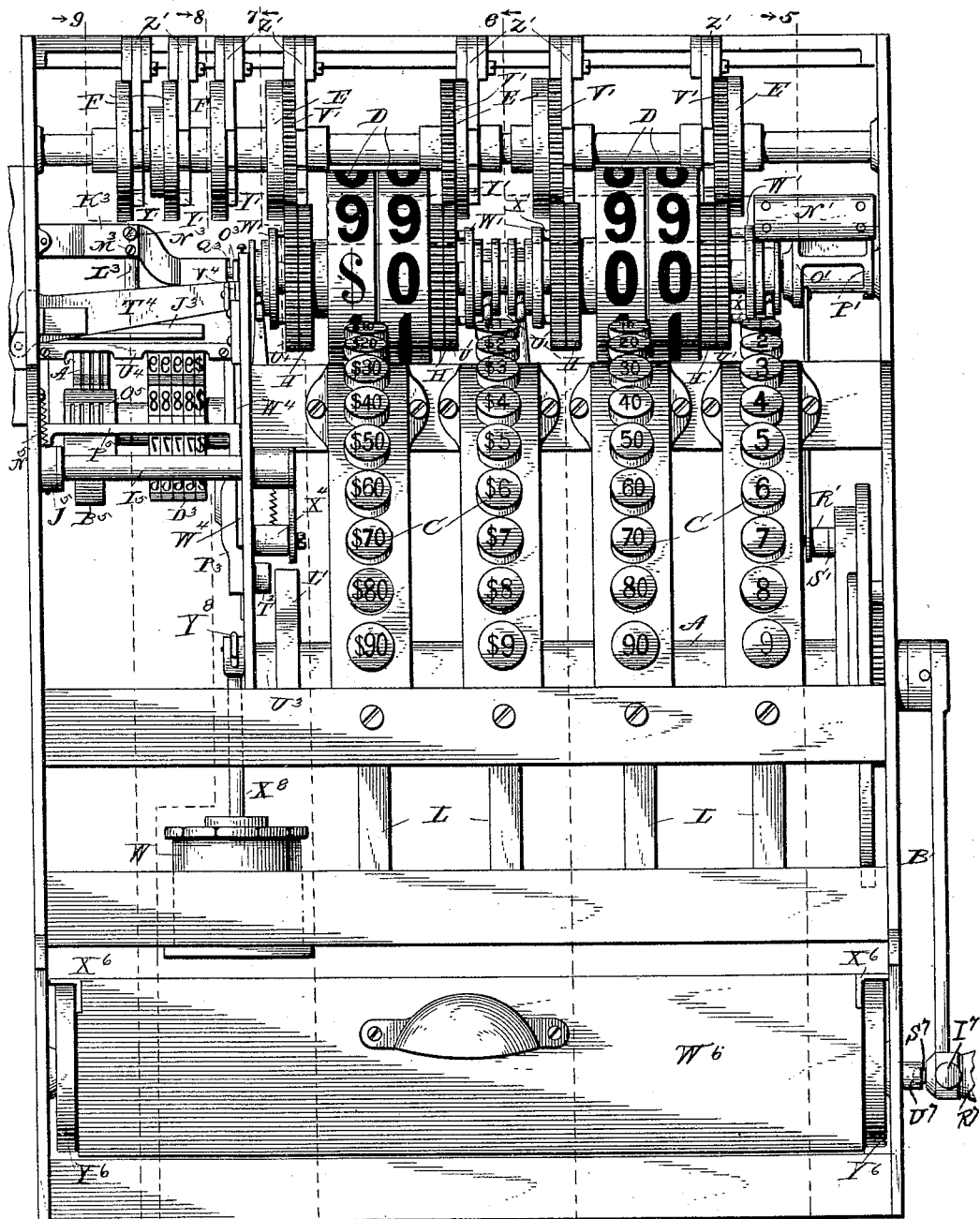

(No Model.) 13 Sheets—Sheet 1.

T. CARNEY.
CASH INDICATOR, REGISTER, AND RECORDER.

No. 466,710. Patented Jan. 5, 1892.

Witnesses.
J Thomson Cross
G. S. Wentworth

Inventor:
Thomas Carney
by Peck & Reeter
his Attorneys.

(No Model.)
13 Sheets—Sheet 2.

T. CARNEY.
CASH INDICATOR, REGISTER, AND RECORDER.

No. 466,710. Patented Jan. 5, 1892.

Witnesses.
J. Thomson Cross
G. H. Wentworth

Inventor:
Thomas Carney
by Peck & Rector
his Attorneys.

(No Model.) 13 Sheets—Sheet 4.

T. CARNEY.
CASH INDICATOR, REGISTER, AND RECORDER.

No. 466,710. Patented Jan. 5, 1892.

Witnesses. Inventor.

(No Model.)  13 Sheets—Sheet 5.

T. CARNEY.
CASH INDICATOR, REGISTER, AND RECORDER.

No. 466,710. Patented Jan. 5, 1892.

Witnesses.
J. Thomson Cross
G. S. Wentworth

Inventor
Thomas Carney
by Peck & Reuter
his Attorneys.

(No Model.) 13 Sheets—Sheet 6.

T. CARNEY.
CASH INDICATOR, REGISTER, AND RECORDER.

No. 466,710. Patented Jan. 5, 1892.

Witnesses:
J. Thomson Crose
G. S. Wentworth

Inventor:
Thomas Carney
by Peck & Rector
his Attorneys.

(No Model.) 13 Sheets—Sheet 7.
T. CARNEY.
CASH INDICATOR, REGISTER, AND RECORDER.

No. 466,710. Patented Jan. 5, 1892.

Witnesses. Inventor.
Thomas Carney
by Peck & Rector
his Attorneys.

(No Model.) 13 Sheets—Sheet 8.
T. CARNEY.
CASH INDICATOR, REGISTER, AND RECORDER.

No. 466,710. Patented Jan. 5, 1892.

Witnesses. Inventor:
Thomas Carney
by Peck & Rector
his Attorneys.

(No Model.)
13 Sheets—Sheet 9.

T. CARNEY.
CASH INDICATOR, REGISTER, AND RECORDER.

No. 466,710.  Patented Jan. 5, 1892.

Witnesses.
J. Thomson Cross
G. Wentworth

Inventor:
Thomas Carney
by Peck & Luton
his Attorneys.

THE NORRIS PETERS CO., PHOTO-LITHO., WASHINGTON, D. C.

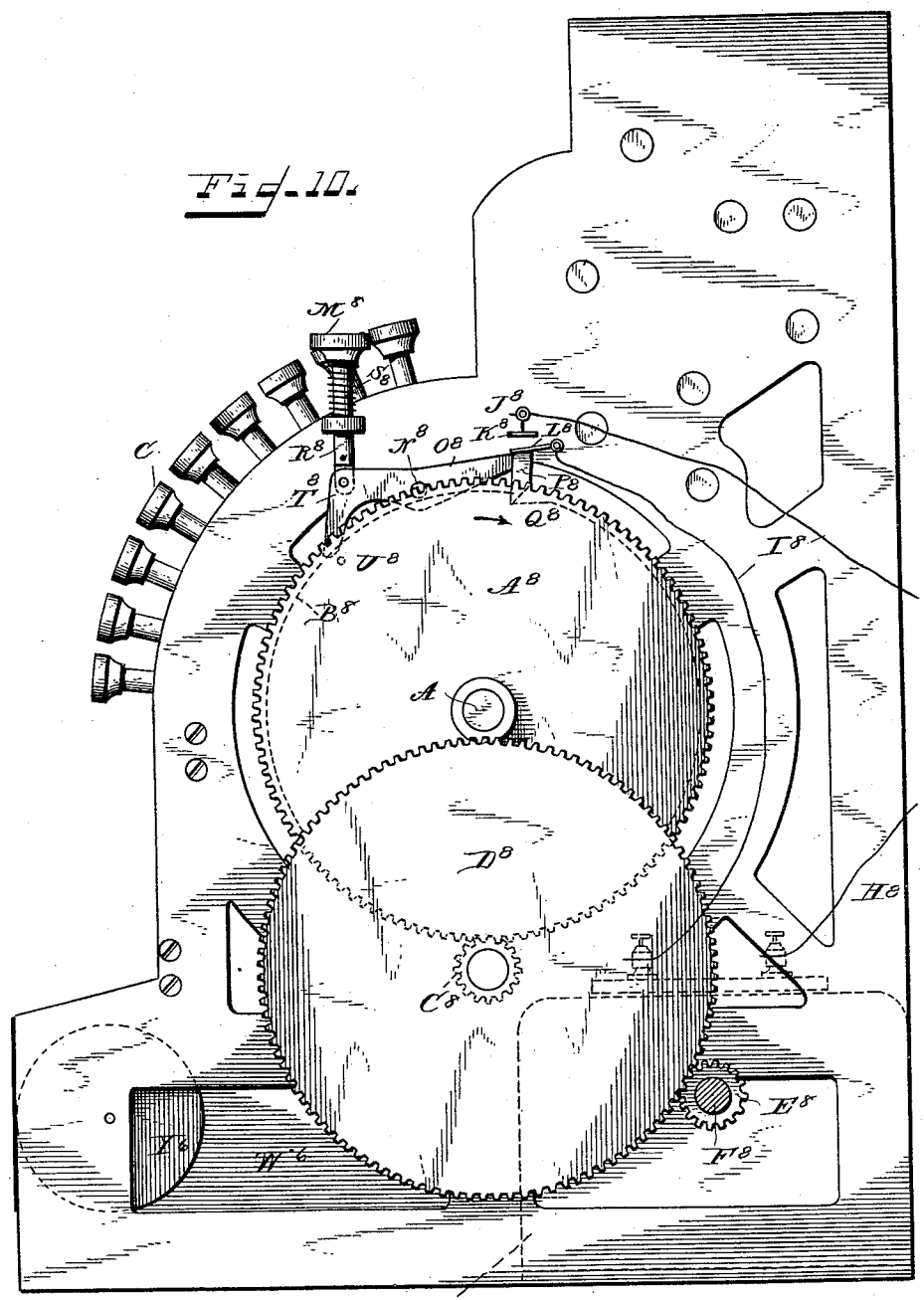

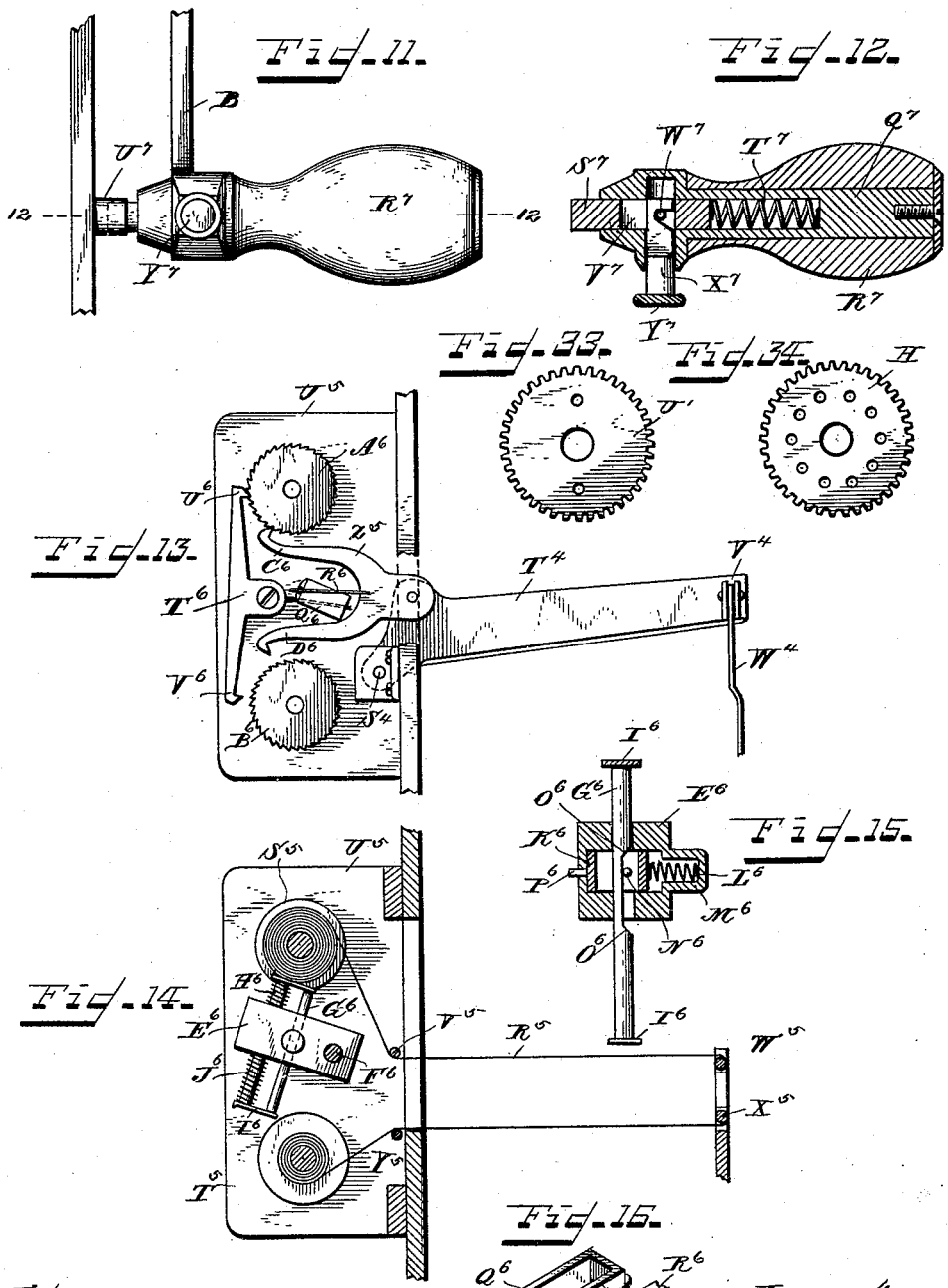

(No Model.) 13 Sheets—Sheet 12.
T. CARNEY.
CASH INDICATOR, REGISTER, AND RECORDER.
No. 466,710. Patented Jan. 5, 1892.
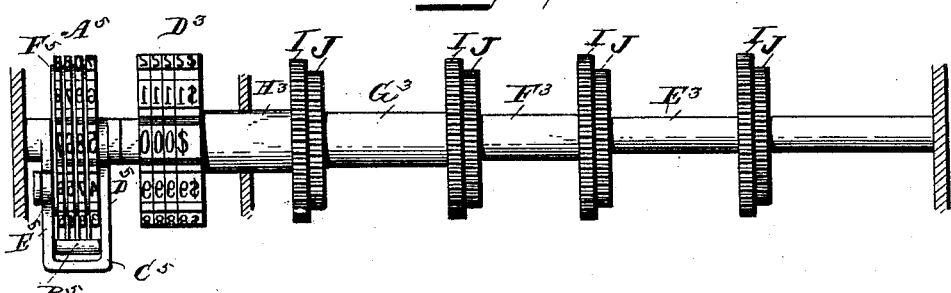
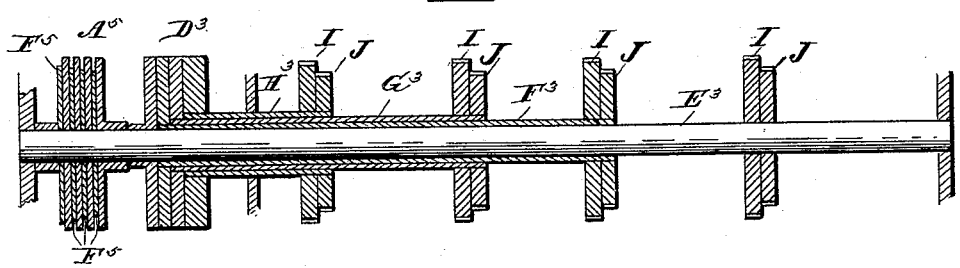
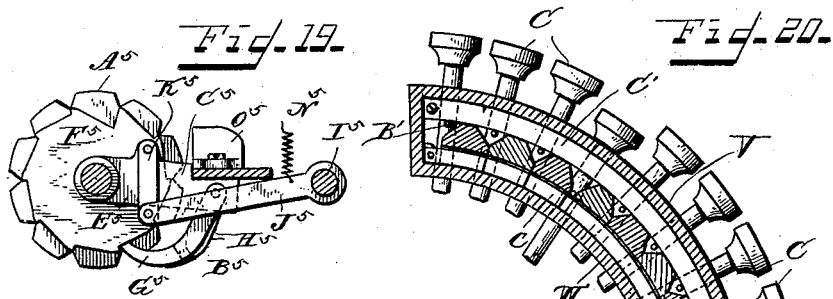
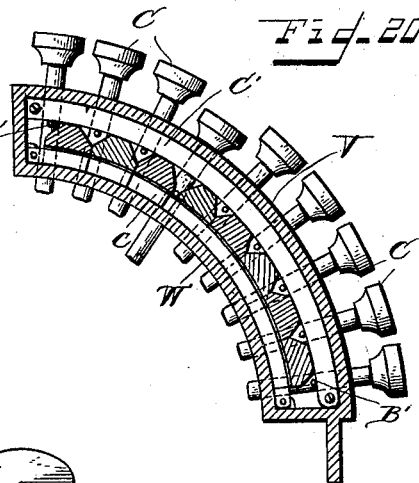
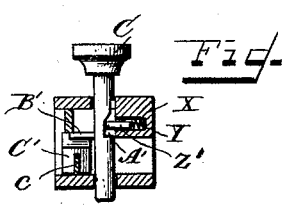
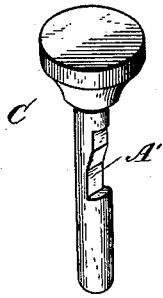

(No Model.)
13 Sheets—Sheet 13.
T. CARNEY.
CASH INDICATOR, REGISTER, AND RECORDER.
No. 466,710. Patented Jan. 5, 1892.
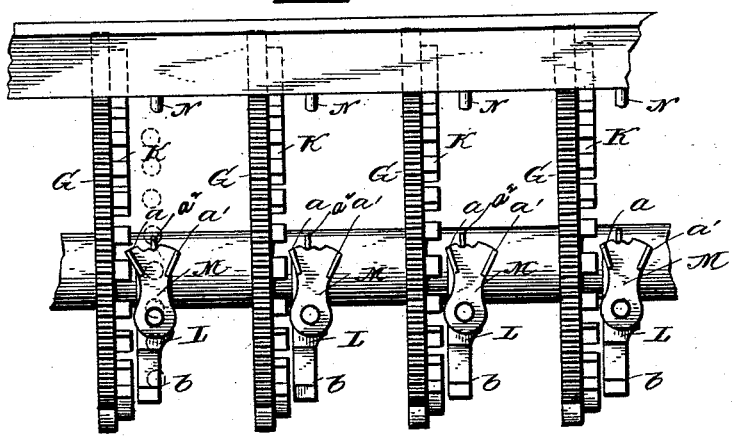
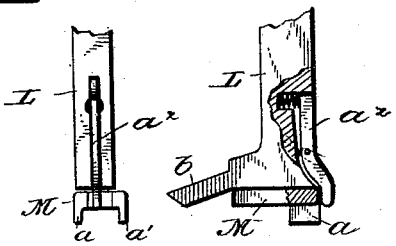
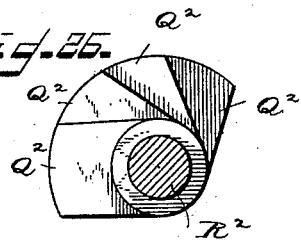
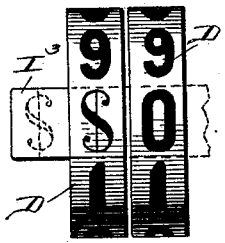
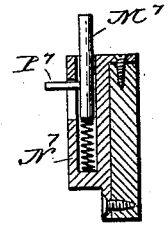
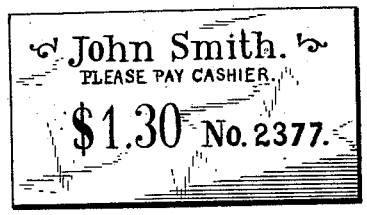
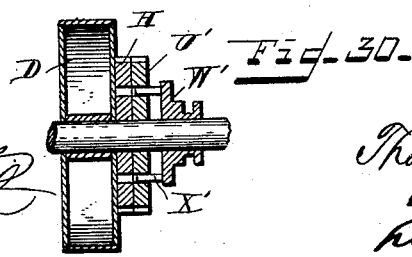
Witnesses.
Inventor.
Thomas Carney
by Peck & Rector
his Attorneys.
THE NORRIS PETERS CO., PHOTO-LITHO., WASHINGTON, D. C.

UNITED STATES PATENT OFFICE.

THOMAS CARNEY, OF DAYTON, OHIO, ASSIGNOR TO THE NATIONAL CASH REGISTER COMPANY, OF SAME PLACE.

CASH INDICATOR, REGISTER, AND RECORDER.

SPECIFICATION forming part of Letters Patent No. 466,710, dated January 5, 1892.

Application filed July 29, 1891. Serial No. 401,059. (No model.)

*To all whom it may concern:*

Be it known that I, THOMAS CARNEY, a citizen of the United States, residing at Dayton, in the county of Montgomery and State of Ohio, have invented certain new and useful Improvements in Cash Registers and Indicators, of which the following is a description, reference being had to the accompanying drawings, forming part of this specification.

My invention has for its object the improved construction of this class of machines; and its novelty consists in the new combinations, arrangements, and constructions of the parts which will be hereinafter set forth, and specifically pointed out in the claims.

Figure 2:
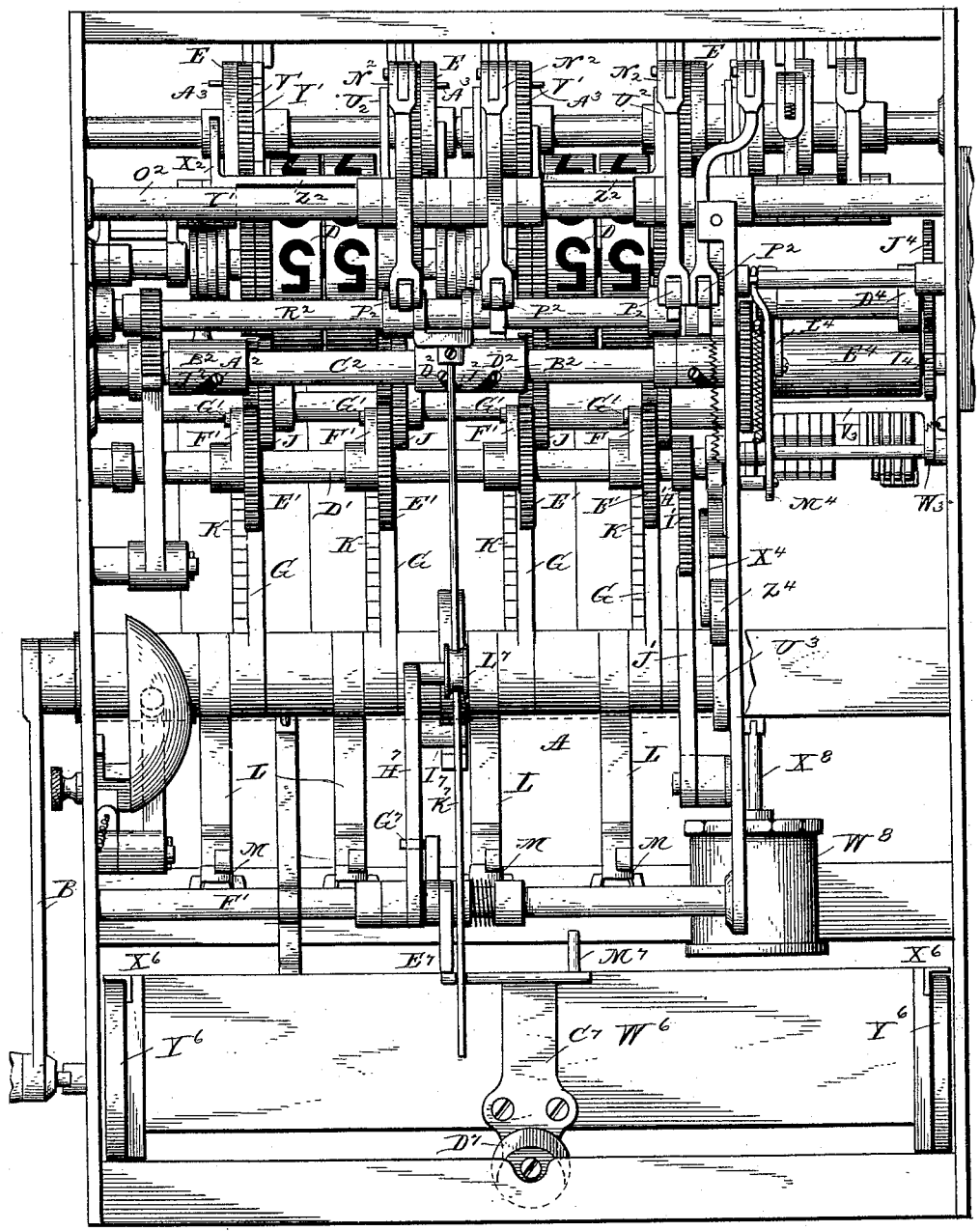
Figure 3:
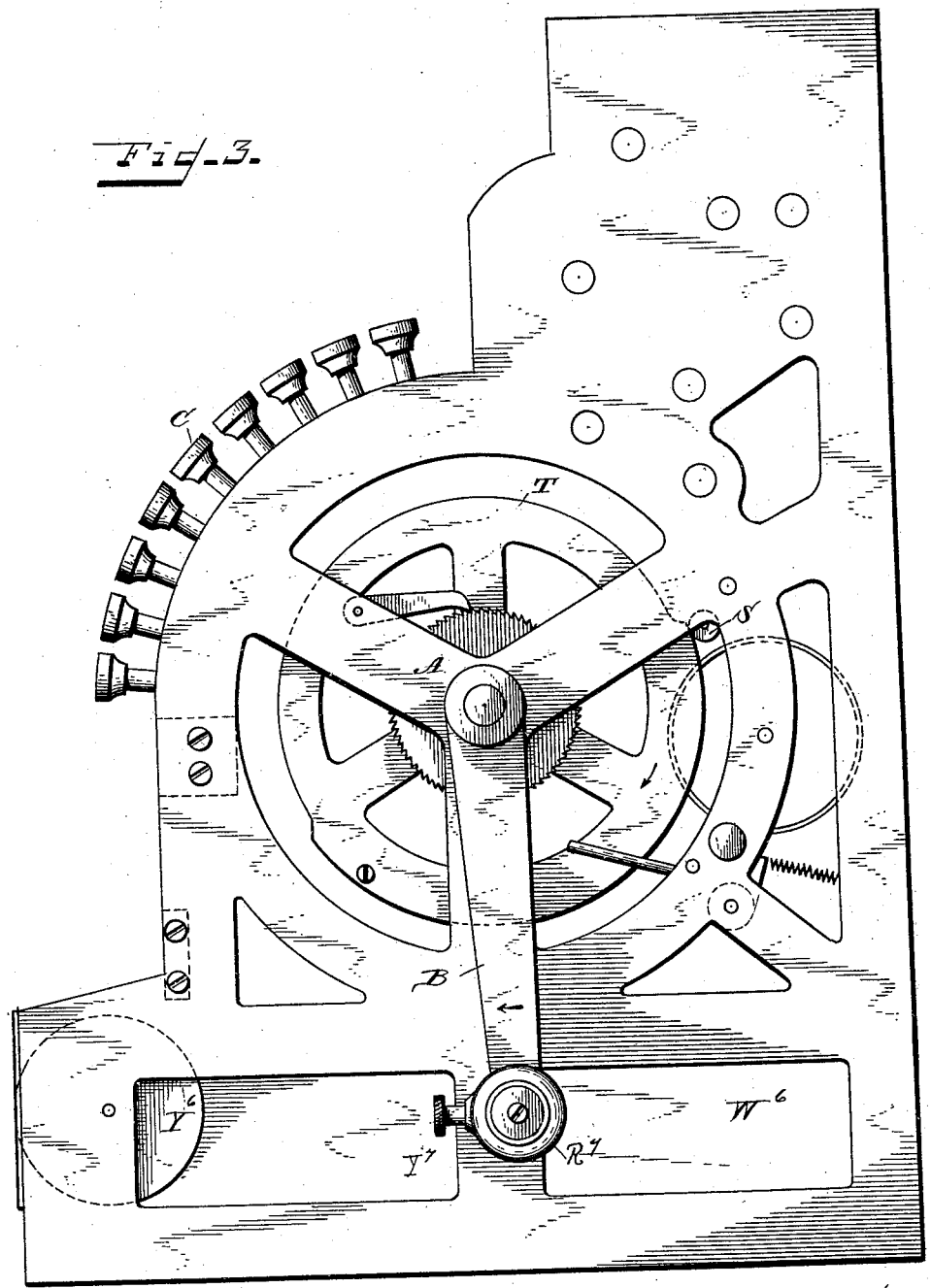
Figure 4:
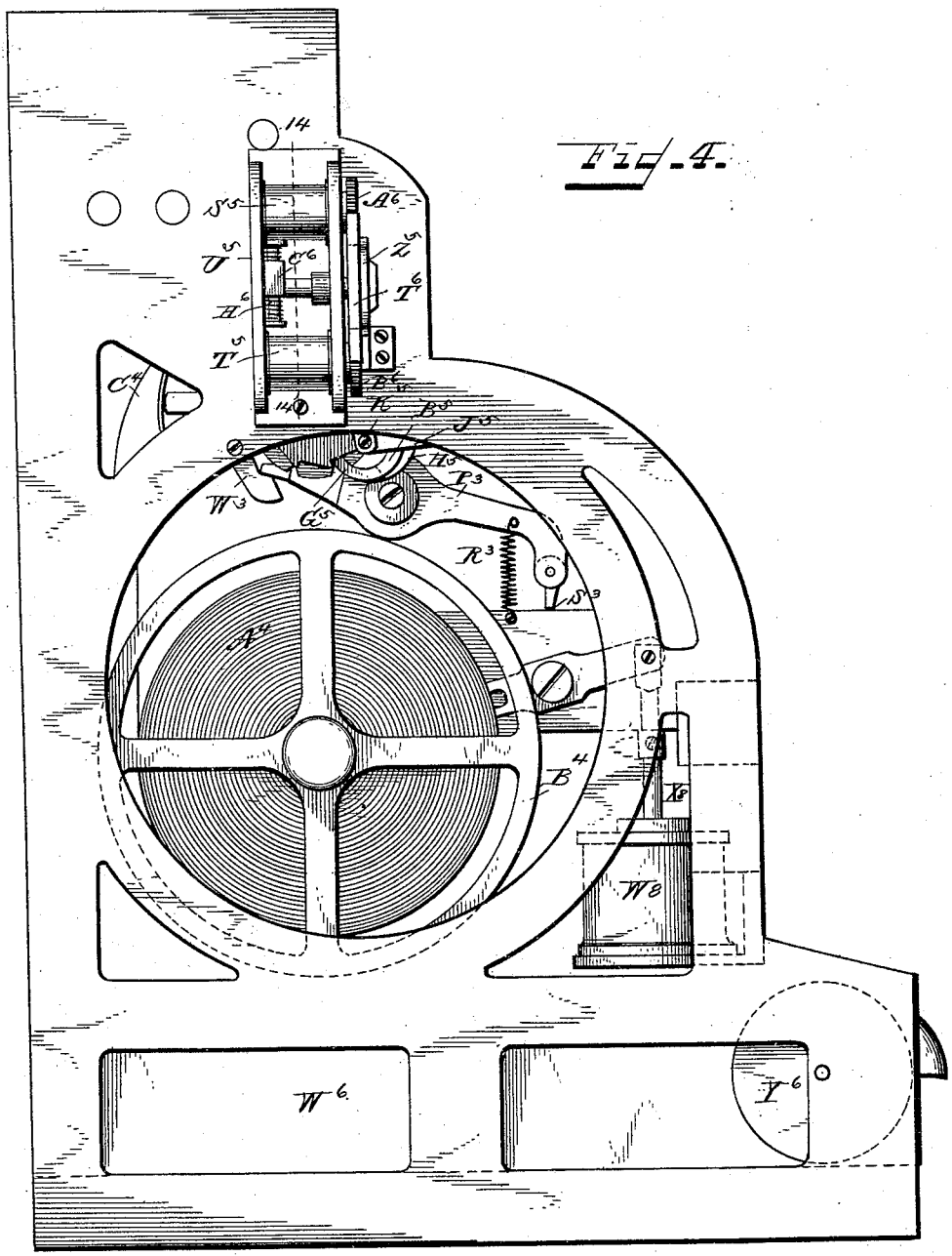
Figure 5:
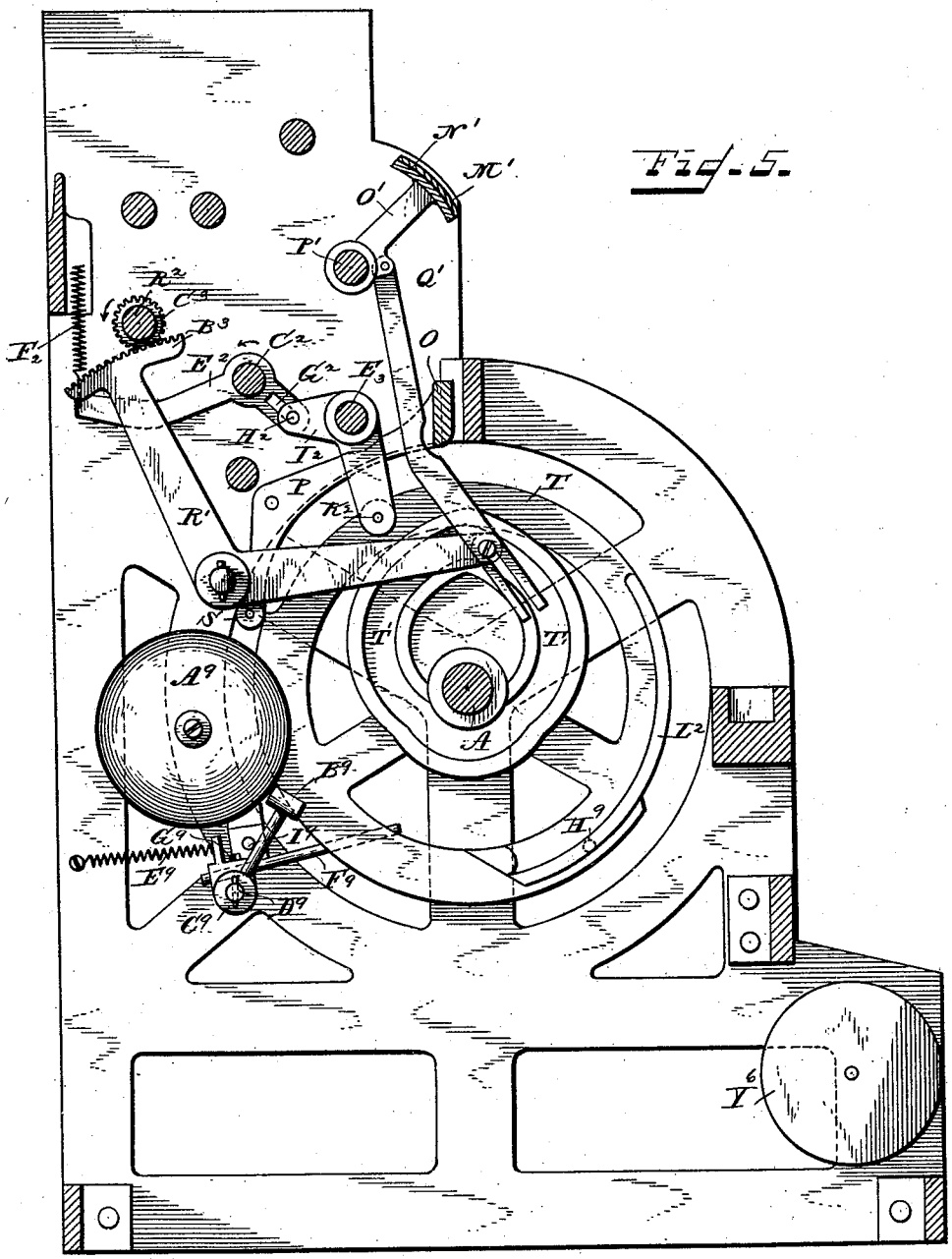
Figure 6:
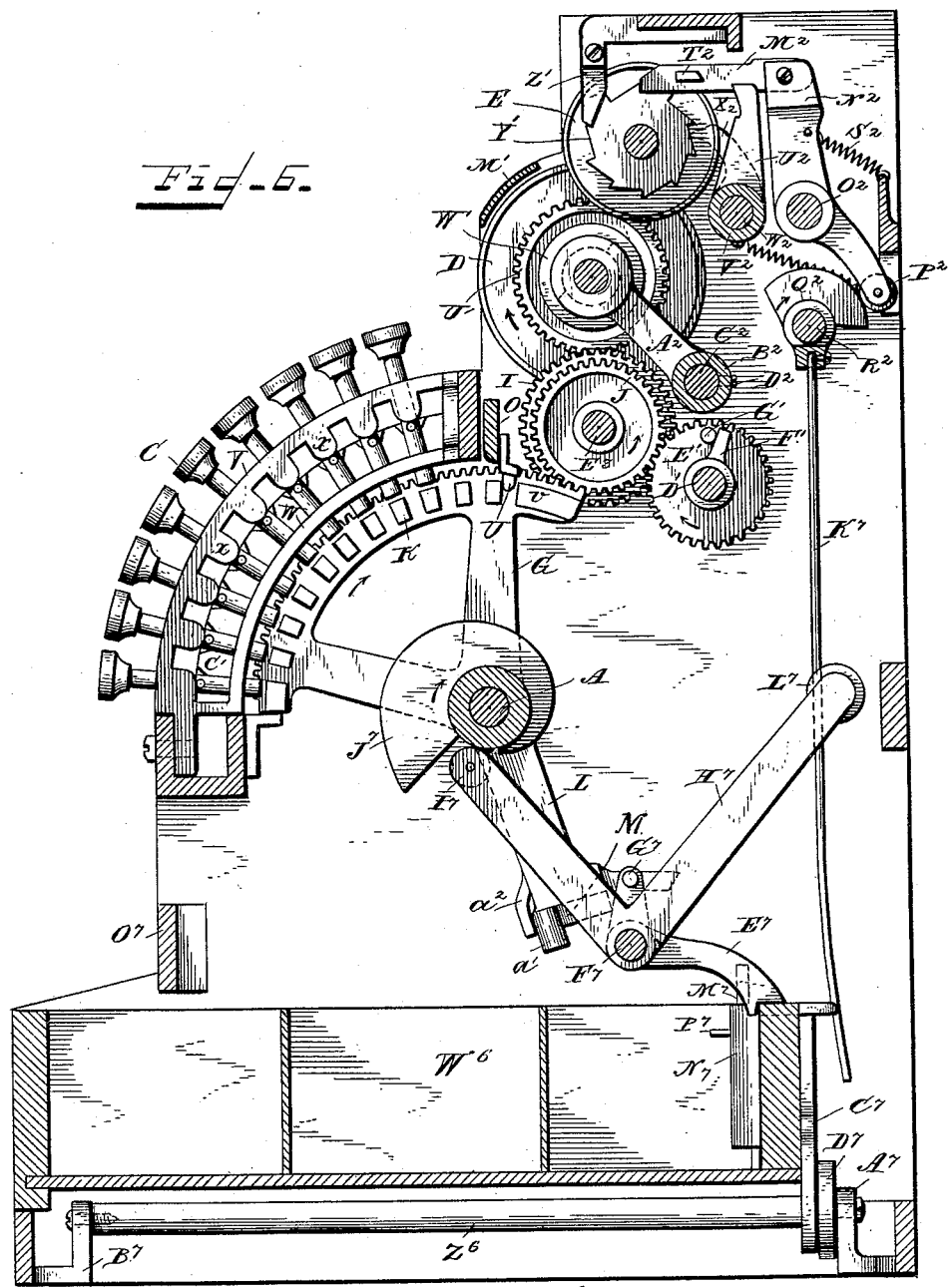
Figures 31, 32:
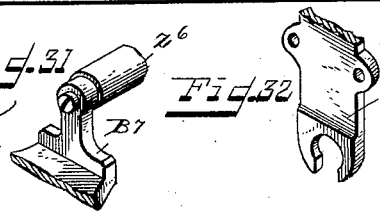
Figure 7:
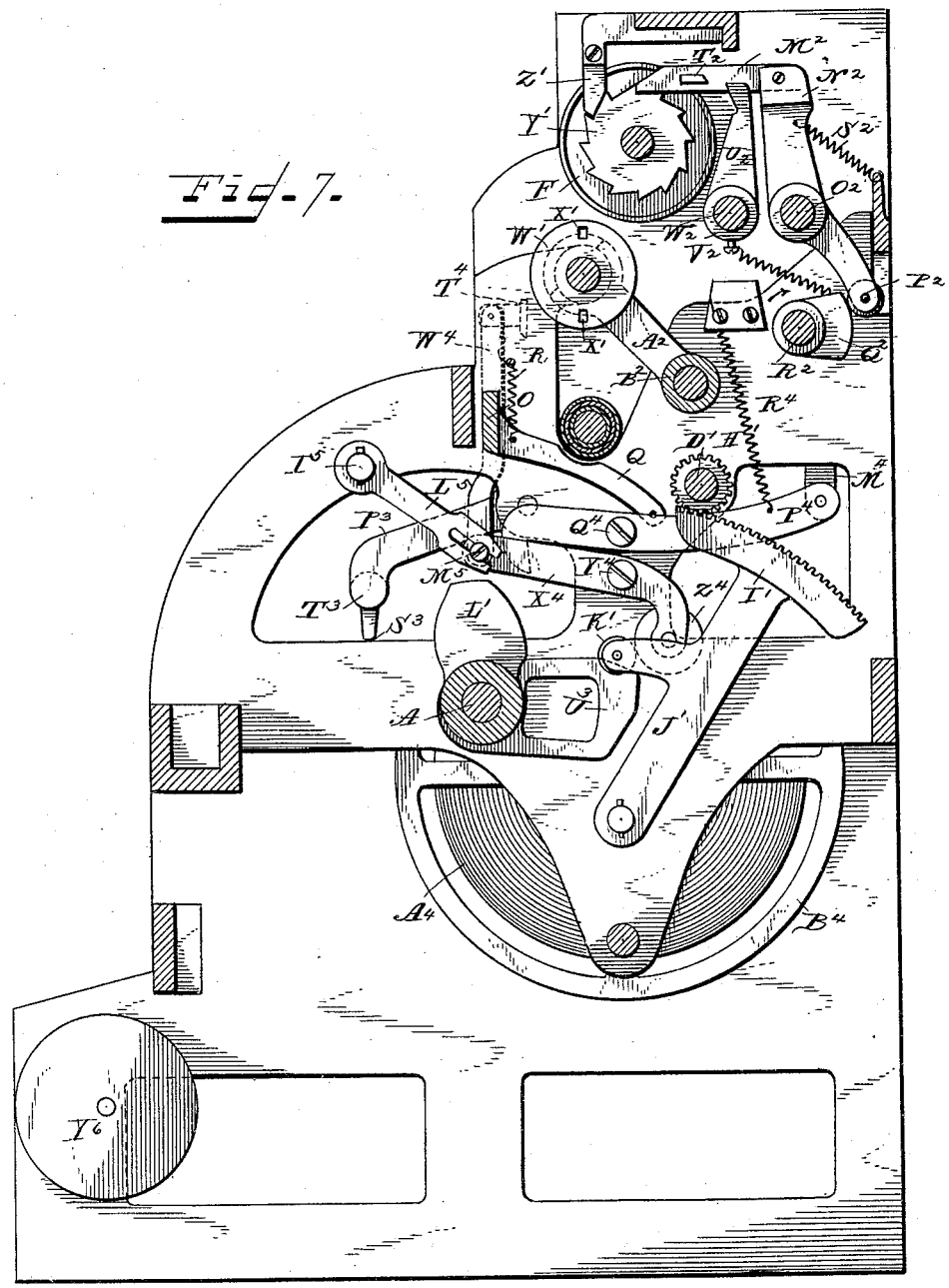
Figure 8:
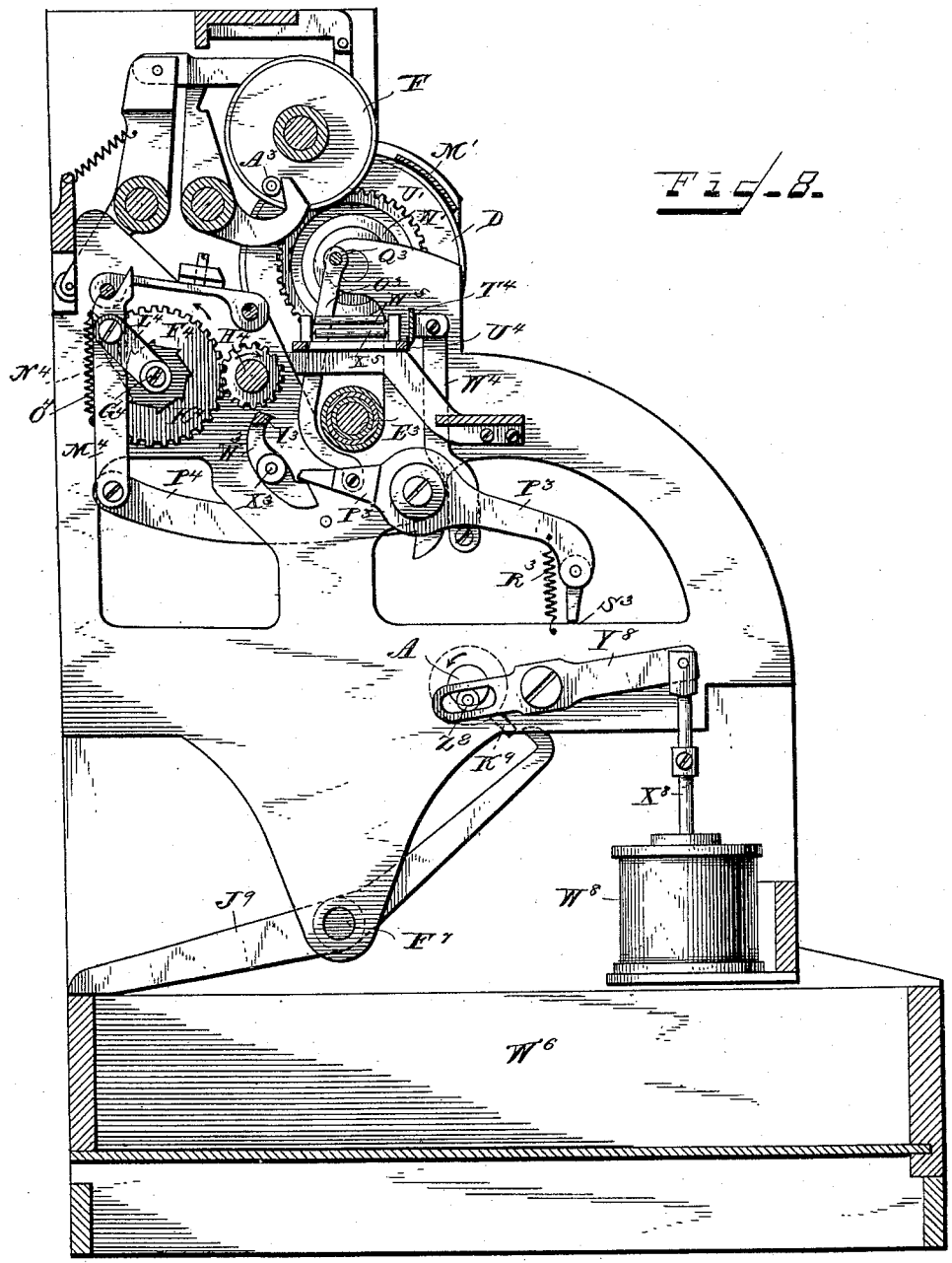
Figure 9:
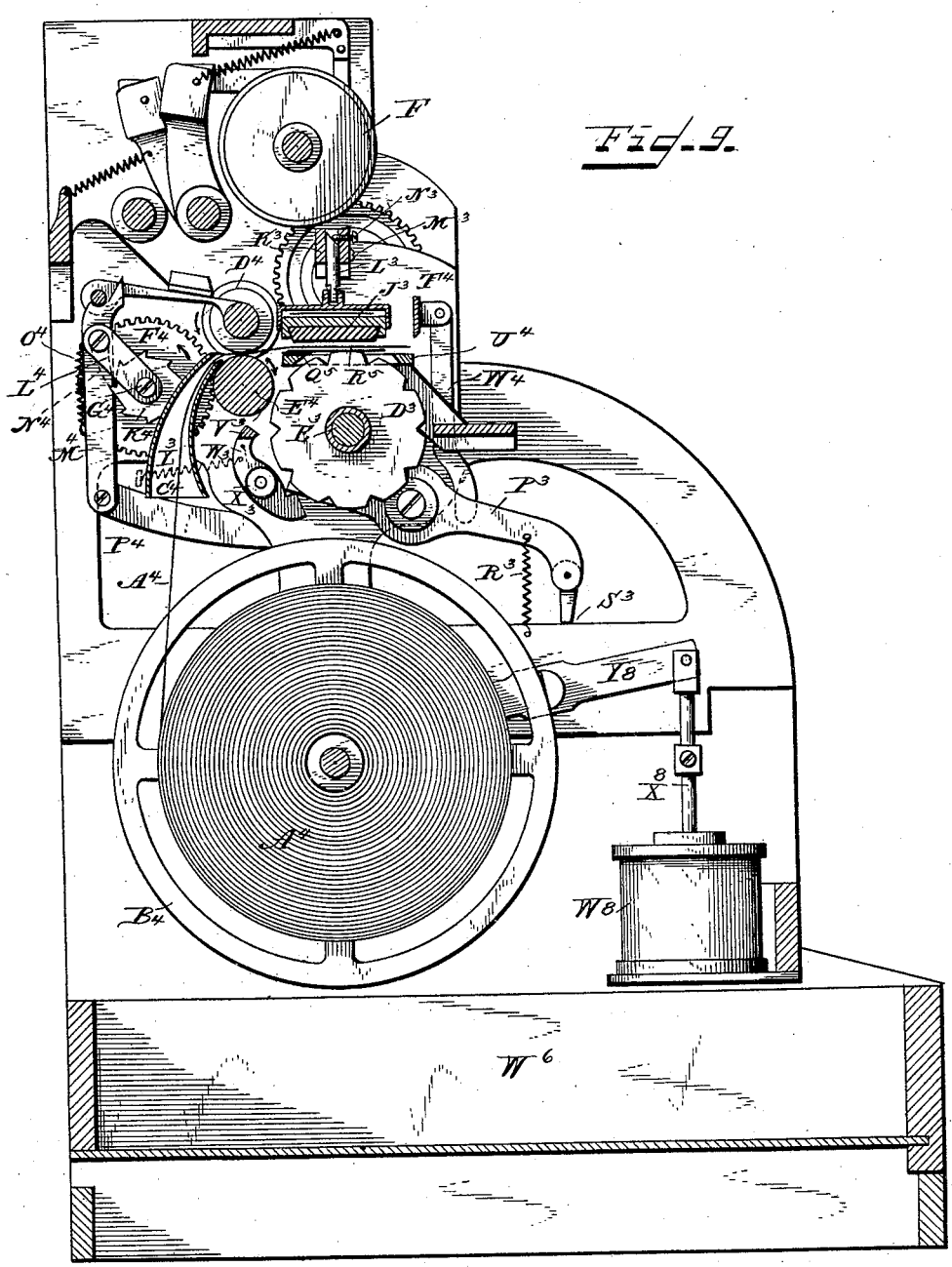

In the accompanying drawings, in which the casing or cabinet which is to inclose the working parts of the machine is not shown, Figure 1 represents a front elevation of the machine, the knob of the operating-handle on the right and a portion of the mechanism which projects beyond the frame-work on the left being broken away. Fig. 2 is a corresponding rear elevation; Fig. 3, an elevation of the right side of the machine; Fig. 4, an elevation of the left side of the machine; Fig. 5, a vertical section approximately on the line 5 5 of Fig. 1, looking toward the right of the machine; Fig. 6, a vertical section approximately on the line 6 6 of Fig. 1, looking toward the left of the machine; Fig. 7, a vertical section approximately on the line 7 7 of Fig. 1, looking toward the left of the machine; Fig. 8, a vertical section approximately on the line 8 8 of Fig. 1, looking toward the right of the machine; Fig. 9, a vertical section approximately on the line 9 9 of Fig. 1, looking toward the right of the machine; Fig. 10, a side elevation of the machine, showing the means for driving it by an electric motor; Fig. 11, an enlarged detail in front elevation of the lower end of the operating-handle and its grasping-knob; Fig. 12, a horizontal section of said knob; Fig. 13, an enlarged detail of the supplemental frame which supports the inking-ribbon spools, the ratchets of said spools, their actuating-pawls, and the knife for severing the paper strip; Fig. 14, a vertical section of the parts shown in Fig. 13, taken on the line 14 14 of Fig. 4. Fig. 15 is an enlarged detail sectional view of some of the parts shown in Fig. 14. Fig. 16 is an enlarged detail perspective view of some of the parts shown in Fig. 13; Fig. 17, a plan view of the printing-wheels, their driving gears, and supports; Fig. 18, a horizontal section of the parts shown in Fig. 17; Fig. 19, a side elevation of the consecutive-numbering type-wheels and their actuating devices; Fig. 20, a vertical section through the supporting-plates and locking-blocks of one of the rows of keys; Fig. 21, a cross-section of the supporting-plates, locking-blocks, &c., of one row of keys; Fig 22, an enlarged perspective view of one of the keys; Fig. 23, a detail front elevation of the four actuating-segments and their co-operating pawls, the latter being shown in a position to which they are turned by a partial revolution of the driving-shaft. Figs. 24 and 25 are details of one of the pawls, the end of its supporting-arm, and spring-catch; Fig. 26, a side elevation of the transfer-cams, showing the shaft upon which they are mounted in section; Fig. 27, a front view of two of the indicator-wheels, a screen carried by one of them, and a stationary dollar-mark behind said screen; Fig. 28, a sectional detail of the housing and spring-pressed rod carried by the drawer; Fig. 29, a plan view of one of the tickets printed by the machine; Fig. 30, a vertical section through one of the indicator-wheels, its driving-gear, the adjacent driving-gear for the registering-wheels, and the clutch for locking the two gears together; Fig. 31, a detail perspective of the front end of the guide-rod for the money-drawer and its supporting-bracket; Fig. 32, a detail perspective of the lower part of the supporting guide-plate secured upon the rear side of the money-drawer; Fig. 33, a side elevation of one of the driving-gears for the registering-wheels, and Fig. 34 a side elevation of one of the driving-gears for the indicator-wheels.

The same letters of reference are used to indicate identical parts in all the figures.

The main driving-shaft, to which power is applied to operate the machine, is a central revoluble shaft A, journaled at its opposite ends in the frame-work of the machine. This shaft is given one complete revolution at each operation of the machine. Power may be applied to it for this purpose in any suitable manner, as by a handle B, (shown in Figs. 1, 2, and 3;) but I prefer to employ an electric motor for this purpose, and have devised a novel combination of such motor with the driving-shaft, by which the latter will be given one complete revolution at each operation of the machine. This feature of my invention will be hereinafter described. A ratchet fast upon the shaft and a pawl cooperating therewith, as shown in Fig. 3, prevent backward movement of the shaft.

My machine is preferably arranged to indicate and register all amounts, excepting fractions of a cent, from one cent to ninety-nine dollars and ninety-nine cents, inclusive, and to that end is provided with four sets of keys C. (Shown in Fig. 1.) Each set contains nine keys, those of the set on the right representing units of cents, from one to nine, inclusive; those of the second set tens of cents, from ten to ninety, inclusive; those of the third set units of dollars, from one to nine, inclusive, and those of the fourth set tens of dollars, from ten to ninety, inclusive. Cooperating with these four sets of keys, one with each set, are four indicator-wheels D, each bearing upon its periphery a series of equidistant indicating-numbers, from one to nine, inclusive. Between the 9 and the 1 on each of three of these wheels is a 0, while between the 9 and the 1 on the fourth wheel is a $, as shown in Fig. 1, where the wheels are in position to expose their zeros, and the dollar-mark at the reading opening or window in the casing which incloses the machine. There are four registering-wheels E, each capable of being thrown into and out of gear with the indicator-wheels D. In addition to the four registering-wheels, which may be geared directly or indirectly to the indicator-wheels, there are on the left additional registering-wheels F to complete the train.

Loosely mounted upon the central shaft A are four segments G, Figs. 2 and 6. Each of these segments, as shown in Figs. 1 and 6, is geared directly to one of the indicator-wheels D by means of a gear H, fast upon the side of or otherwise rigid with the latter, and gears I J intermediate the gear H and segment S. The gear H is shown in Fig. 1, but in Fig. 6 is immediately behind and hidden by the gear U' there shown, the two gears being side by side, as seen in Fig. 1. The gear U' (seen in Fig. 6) is that beside the gear H of the third indicator-wheel in Fig. 1. The gears I J are fast together or integral with each other, the two being employed simply to properly proportion the movements of the indicator-wheel to that of the segment G.

Each of the segments G is located in a plane a short distance to the left of the vertical plane of one of the sets of the keys C and has upon its side next to the set of keys a series of lugs K. Fast upon the shaft A, one beside and immediately to the right of each of the segments G, are four arms or pawl-supports L. These arms L are located in substantially the same vertical planes as the sets of keys C, and each has pivoted to its outer end a pawl M, Figs. 6, 23, 24, and 25. At its end opposite that at which it is pivoted to its arm L each of these pawls is provided with two oppositely-inclined lugs $a$ $a'$, forming a flaring mouth or passage between them. The arms L are of such length that the pawls M in the revolutions of the shaft A clear the inner ends of the stems of the keys C when the latter are in their normal position; but when any key is pushed inward its inner end is brought into the path of travel of the corresponding pawl M. In such case when the pawl reaches the key the inner beveled face of its lug $a$ will engage the inner end of the key, and as the pawl moves past the key the latter will rock it to the left upon its pivot and force its lug $a$ into engagement with one of the lugs K upon the side of the adjacent segment G, as seen in the case of the left-hand pawl in Fig. 23, where the keys are indicated by the dotted lines. In the further revolution of the shaft A and backward movement of the pawl the latter will carry the segment with it until the inner beveled face of the opposite lug $a'$ of the pawl engages the fixed trip N upon the frame-work, which pin forces the pawl to the right as it passes and disengages it from the lug upon the segment G, whereupon the latter is arrested and the driving-shaft and pawl continue their backward movement to normal position. The backward movement of the segment G will turn the indicator-wheel D in the direction of the arrow, and one or another of its numbers will be exposed at the reading-opening, according to the extent of movement of the segment. If the pawl is thrown into engagement with one of the lugs at the lower forward end of the segment, it will be seen that it will move the segment a greater distance before being disengaged from it by the trip N than if it were thrown into engagement with a lug near the middle or rear end of the segment. Therefore if one of the lower keys of a set be pushed inward before the driving-shaft is revolved the segment will be turned by the pawl a greater distance than if the operated key were one farther up in the set. The lowest key of the set is therefore made the key of highest value, and they decrease in value toward the uppermost key, which is the one of lowest value. The adjustment of the parts is such that when any key is pushed in and the driving-shaft A then revolved the pawl will be thrown into engagement with the proper lug upon the segment G to cause the latter to turn the indicator-wheel just far enough to expose at the reading-opening its number, which corresponds to the value of the operated key. Thus if the lowermost key be operated the indicator-wheel will be turned nearly a complete revolution and its number 9 brought to the reading-opening. If the middle key of the set be operated, the indicator-wheel will be turned just far enough to expose its number 5, while if the uppermost key be the one operated the wheel will be turned only a short distance and a number 1 be exposed. A spring-pressed catch $a^2$, carried in a slot in the outer end of the arm L and engaging suitable notches in the end of the pawl M, yieldingly holds the latter in the respective positions to which it is moved by the operated key and by the trip, so that when the pawl is disengaged from the segment by the trip N it remains out of engaging position until it is thrown into such position by engagement with another operated key upon a succeeding operation of the machine.

Secured upon or integral with each of the arms L, behind and in line with the pawl thereon, is a wiper-block $b$, which is in the same vertical plane as the row of keys of that set. This block just clears the inner ends of the keys when they are in normal position and serves to push out or reset the operated key after the latter has thrown the pawl into engagement with the segment. It will be understood that if a key in each of two or more of the sets be pushed inward and the driving-shaft A then given a complete revolution the pawls M, which correspond to the sets containing the operated keys, will all be thrown into engagement with their respective segments at the proper points to cause the segments to move the indicator-wheels the proper distances to indicate the values of the operated keys. Thus if the lowermost or the 9 key in the right-hand set be pushed inward the next to the lowest or the 8 key in the second set, and the third from the lowest or the 7 key in the third set, and the driving-shaft be then revolved, the first segment will turn the wheel D on the right until its number 9 is brought to the reading-opening, the second segment will turn the second wheel until its number 8 is brought to the reading-opening, and the third segment will turn the third wheel until its number 7 is brought to the reading-opening, while the fourth indicator-wheel will remain stationary, with its $ at the reading-opening, and $7.89 will thus be indicated.

For the purpose of locking the segments, and consequently the indicator-wheels, as soon as the pawls M are disengaged from them by the trips N, I provide a locking-bar O, Figs. 5, 6, and 7. This bar extends transversely across the machine above the segments G and is hung to the frame-work by side arms P Q at its opposite ends, the former of which arms is shown in Fig. 5 and the latter in Fig. 7. A coiled spring R, Fig. 7, normally tends to pull the bar O upward. The right-hand arm P of the locking-bar, Fig. 5, is extended rearward and downward from the point at which it is pivoted to the frame-work, and at its lower end carries a friction-roller S, which bears upon the periphery of a cam-ring T, fast upon the shaft A just within the right-hand side frame of the machine, Figs. 3 and 5. A portion of the periphery of the cam-ring T is cut away, dividing the periphery into a raised portion and a depressed portion. When the ring is in such position that the roller S bears upon the raised portion, the locking-bar O is thrown downward; but when the depressed portion of the periphery of the ring is brought beneath the roller S the spring R in Fig. 7 is permitted to lift the bar O. The bar has depending from it four locking-lugs U, one of which is shown in Fig. 6. These lugs are located in the vertical planes of the rows of lugs K upon the segments G, and when the bar O is in its lowermost position the lugs U rest between adjacent lugs upon the segments, as shown in Fig. 6, and lock the segments from movement. When the driving-shaft A is in its normal position of rest, as shown in the drawings, the cam-ring T is in such position that the roller S upon the arm P of the locking-bar rests upon the raised portion of its periphery, as shown in Figs. 3 and 5; but as soon as the shaft A is started forward the depressed portion of the periphery of the ring T is brought beneath the roller S, whereupon the spring R, Fig. 7, lifts the bar O and unlocks the segments. The bar O is maintained out of locking position by its spring until in the revolution of the shaft A the pawls M have passed the trips N and been disengaged from the segments, whereupon the raised portion of the periphery is again brought beneath the roller S and the bar O thereby thrown downward and its lugs U engaged with the segments to lock the latter. During the further return movement of the driving-shaft to normal position the roller S rides upon the raised portion of the periphery of the cam-ring and the segments remain locked. When the shaft reaches normal position, the cam-ring is brought to the position shown in Figs. 3 and 5, ready to release the locking-bar at the beginning of the next operation of the machine.

I am aware that in machines of this class it is not broadly new to combine a revoluble driving-shaft having fast upon it arms carrying pawls with sets of keys actuating segments, trips, indicator-wheels, and a locking-bar co-operating in the general manner described above. So far as this part of the machine is concerned, my invention resides, chiefly, in the novel construction of the pawls M, heretofore described, and in the novel construction of the keys C and their associated devices, which will be now described.

As shown in Figs. 6 and 20, the stems of the keys C are mounted in concentric segmental guides V W, their inner ends projecting a short distance beyond the latter. The guide-plate V has upon its under side a series of spring-housings X, Figs. 6 and 21, one for each key. Each of these housings, as shown in Fig. 21, contains a coiled spring Y and plug Z. The latter is forced by the spring into engagement with a recess A', cut in the adjacent side of the key. (See Fig. 22.) When the key is in its outer position, the end of the plug Z engages the lower and deepest portion of the recess, such lower and deeper portion being connected with the upper and shallower portion by a beveled surface, as shown. When the key is pushed inward, this beveled surface of the recess forces the plug Z to one side against the resistance of its spring Y, and when the upper shallower portion of the recess is brought into engagement with the plug the pressure of the latter yieldingly holds the key in its inward position. Likewise, when the key is in its outer and normal position the engagement of the plug Z with the deeper portion of the recess below the beveled surface yieldingly holds the key in its outer position. If the key is pushed inward slightly, but not far enough to carry the beveled end of the recess below the end of the plug, the pressure of the latter against such surface will throw the key outward again when the pressure upon it is removed. It is therefore necessary to push the key inward to its full extent and engage the upper and shallower portion of the recess with the plug Z in order to retain the key in such inward position, and when this is done the key is in position to be engaged by the operating-pawl M when the driving-shaft is revolved.

Passed transversely through each of the keys and projecting from it at one side (the left side in the drawings) is a pin B', Figs. 6 and 20. These pins co-operate with a series of locking-blocks C', slotted on their under sides and arranged in a row on a longitudinal guide-rib c between the guides V and W, Figs. 20 and 21, and capable of slight longitudinal movement thereon. The adjacent upper corners of these blocks are beveled off to form converging surfaces immediately beneath the pins B'. When any key is pushed inward, its pin B', entering the space between the adjacent beveled corners of the blocks below it, as seen in Fig. 20, separates said blocks and passes freely between them; but if it be attempted to push in another key while this one is in its inward position the pin B' of the second key will become locked against the blocks C' between it and the first-mentioned key and cannot be pressed farther inward. So if it be attempted to press two keys inward at the same time they will both become locked against the intermediate blocks and neither can be operated.

The next feature of my invention, and one which I believe to be broadly new, relates to the method and means for restoring the segments to normal position and returning the indicator-wheels to zero. Heretofore in the machines of this character, which I have referred to as being old, the segments, when released by the locking-bar at the beginning of the forward stroke of the operating-handle or driving-shaft, were drawn down to normal position by springs and the indicator-wheels thereby reset to zero; but the employment of springs for this purpose is objectionable for a number of reasons, one of which is that the resetting of the segments by the springs jars the machine, thereby straining the parts and making an unpleasant noise, and another of which is the fact that in making an indication the segments have to be moved against the resistance of such springs. In my machine the segments are restored to normal position and the indicator-wheels returned to zero by a positive movement communicated from the driving-shaft at the beginning of the forward movement of the latter. The means which I employ for this purpose are illustrated in Figs. 2, 6, and 7, and may be described as follows: Loose upon a shaft D', suitably journaled in the frame-work, are four gears E', each of which meshes with one of the gears J, which latter are in constant mesh with the segments G. Fast upon the shaft D', one beside each of the gears E', are four arms F'. Projecting from the side of each gear E' into the path of the adjacent arm F' is a pin G'. It will be seen from this that if the shaft D' be revolved in one direction these arms F' will engage the pins G' and turn the gears E', and consequently the gears J and the indicator-wheels and segments. It will also be seen that when a segment is moved in the direction of the arrow in Fig. 6 in making an indication its gear J will turn the corresponding gear E' in the direction of the arrow on the latter, and the pin G' upon such gear E' will carry the arm F' and shaft D' around with it. The distance turned by the gear E' will be determined by the value of the operated key. If the key be one of the higher values in the set, the gear E' will be turned farther than if the key be one of the lower values, and in each case the arm F' and shaft D' will be turned a corresponding distance. Such being the case, it will be evident that if the shaft D' be then turned back to its normal position (shown in Fig. 6) the arm F', engaging the pin G' upon the gear E', will carry the latter back to normal position, and thereby restore the segment to the position shown in Fig. 6 and bring the indicator-wheel to zero. If several keys in different sets and in different relative positions in their respective sets be then pressed in before the driving-shaft A is given its revolution, the respective gears will be turned different distances; but inasmuch as the arms F' are all fast upon the shaft D' the latter and all of the arms F' will be turned as far as that gear E' which is given the greatest movement. Thus, if the uppermost key in the right-hand set be operated, the fifth key in the second set, and the ninth key in the third set to indicate and register $9.51, the first gear E' on the right will be turned but a very short distance, the second gear about five times as far, while the third gear E' will be turned the greater part of a revolution and will turn its adjacent arm F', and consequently the shaft D' and all of the arms F', a corresponding portion of a revolution. Such being the case, when the indication is completed and the parts come to rest the pin G' on the third gear will rest against or immediately adjacent to its co-operating arm F', while there will be considerable space between the pin G' of the second gear and its co-operating arm F' and a still greater space between the pin G' of the first gear and its co-operating arm F'. If the shaft D' be now returned to normal position, (shown in Fig. 6,) the arm F' adjacent to the third gear, being already in engagement with the pin upon said gear, will immediately begin to turn that gear back with it; but the first and second gears will remain stationary until in the movement of the shaft D' their respective arms F' come into engagement with their pins G', whereupon said arms will pick up said gears, and all three of the gears will then move back to normal position. It will thus be understood that in whatever position the different gears E' are left by the operation of the machine in making an indication they will all be picked up by the arms F' in the return movement of the shaft D' and all of the segments G be thereby restored to normal position and all of the indicator-wheels D returned to zero.

It now remains to describe the means employed for returning the shaft D' to normal position. This is effected during the first part of the forward movement of the operating-handle or driving-shaft, so that all of the segments are restored to normal position and the indicator-wheels are all brought to zero before the pawls M reach the lowermost keys in the sets, so that the segments are always back in normal position in time to be engaged by such pawls. Fast upon the shaft D', near its right-hand end in Fig. 2, and also shown in Fig. 7, is a pinion H', which meshes with a segment-rack I', carried by an arm J', pivotally supported at its lower end and free to oscillate backward and forward. Projecting from the arm J' is a horizontal arm carrying a friction-roller K'. Fast upon the main driving-shaft A, in the same vertical plane as the roller K', is a cam L'. In the normal position of the parts shown in Fig. 7 the cam L' in the revolutions of the shaft A will just clear the roller K'; but if the rack I' has been oscillated forward the roller K' will have been brought into the path of the cam L', and the latter, when the shaft A is revolved, will bear against the roller K' and force the rack I' backward to the position shown in Fig. 7. Now the rack I' is oscillated forward every time the machine is operated to make an indication, for, as before explained, whenever any of the segments G are moved in making an indication the corresponding gears E' are likewise moved, and the pins G' upon such gears, engaging the arms F' of the shaft D', will turn the latter a corresponding distance in the direction of the arrow upon the gear E' in Fig. 6 and the arrow beside the pinion H' in Fig. 7, and this will carry the rack I' forward. The distance which the rack I' will be moved forward will be determined by the relative position of the operated key in its set, or, if two or more keys are operated, by the key which has the lower position and higher value; but to whatever position the rack I' is moved it will remain in such position when the indication is completed and the parts are brought to rest with the operating-handle and driving-shaft in normal position. Such being the case, at the beginning of the next operation of the machine the cam L' will engage the roller K' and force the rack I' backward to the position shown in Fig. 7 and thereby restore the shaft D' and its arms F' to the position shown in Fig. 6, and this will return the segments to normal position and bring all of the indicator-wheels to zero.

As before stated, in the machines of this character which I have referred to as being old the indicator-wheels were restored to normal position by the springs at the beginning of the forward movement of the driving-shaft; and my present invention consists in the employment of means for restoring them to such position by a positive movement imparted by the shaft. Such being the case, this feature of my invention is not restricted, in its broader scope, either to the means I have shown for connecting the driving-shaft with and disconnecting it from the indicator-wheels (such means, with the exception of the particular construction of the pawls, being old) nor to the particular construction and arrangement of the devices for resetting the wheels to zero, but contemplates, broadly, the combination of the indicator-wheels and the driving-shaft, capable of connection with and disconnection from each other by any suitable means, with means operated by said shaft for positively returning the wheels to zero at the beginning of the forward movement of the shaft.

The next feature of my invention relates to an automatic screen for the indicator-wheels, which moves between said wheels and the reading-opening at the beginning of the operation of the machine and forward movement of the driving-shaft and hides said wheels from view during the time they are being reset to zero, and, preferably, also during the time they are being moved into position to make an indication. When such indication is completed, the screen is automatically moved away and the numbers on the indicator-wheels are exposed at the reading-opening. This screen is shown in Figs. 1, 5, 6, and 8, the means for operating it being principally shown in Fig. 5. It consists of a horizontal plate M', secured at its right-hand end to a support N', carried by arms O', loosely mounted upon the shaft P', Figs. 1 and 5. In Fig. 1 the support N' and its arms O' are shown in solid lines; but the screen-plate itself, extending to the left across the indicator-wheels, is shown in dotted lines to prevent it obscuring other parts in said view. In Fig. 1 the reading-opening in the casing is immediately in front of the three zeros and the dollar-mark on the indicator-wheels, and at the beginning of the operation of the machine, by the means hereinafter described, the screen-plate is lowered to a position immediately in front of the center of the wheels behind the reading-opening, so that the wheels cannot be seen through the reading-opening while the screen remains in that position. The screen is operated by an arm Q', pivoted at its upper end to one of the arms O' and having its lower end slotted and embracing a pin upon the forward end of one arm of a bell-crank lever R', pivotally supported at its elbow upon a stud projecting inward from the side frame of the machine. The front end of the bell-crank lever R' carries upon its side opposite the pin above referred to a friction-roller S', Fig. 1, which fits in a cam-groove in a plate T', fast upon the driving-shaft A. This cam-groove is of such shape and the plate T' arranged in such position that as soon as the driving-shaft A is started in the direction of the arrow at the beginning of the operation of the machine the friction-roller and front end of the bell-crank R' are moved downward, thereby lowering the arm Q' and screen M' and bringing the latter directly in front of the indicator-wheels. The parts remain in this position until the driving-shaft nearly completes its revolution, whereupon the cam-groove lifts the friction-roller S' and front end of the bell-crank R', and likewise the arm Q' and screen M', and exposes the indicator-wheels at the reading-opening. The main purpose of the bell-crank R' is to transmit movement from the cam T' to other parts of the machine, hereinafter described, through the medium of a rack carried by the rear arm of the bell-crank, and its connection with the arm Q' is merely incidental to the convenient construction of the machine. So far as the operation of the screen is concerned the arm Q' might carry its own friction-roller fitting within the cam-groove of the plate T' and the bell-crank be dispensed with.

An automatic screen of the character above described is desirable in a machine of this class for the reason, among others, that it tends to prevent fraudulent manipulation of the machine. In the absence of such a device when a sale of less value than the one before indicated is made the clerk might be able in some instances to indicate the amount of the second sale by simply starting the operating-handle and partially restoring the indicator-wheels to zero. Thus if the number "9" on the second indicator-wheel should be exposed at the reading-opening, in indication of a previous sale of ninety cents, and the next sale should be fifty cents, the clerk might start the operating-handle forward slightly and move the indicator-wheel back toward zero until its number "5" was exposed at the reading-opening and then stop. In this manner the amount of the sale might be correctly indicated to the customer without operating any key or making any registration. Such a manipulation of the machine may be prevented by the screen, even if the latter is moved from in front of the indicator-wheels as soon as they are returned to zero, for after the wheels are returned to zero the only way the clerk can indicate the amount of the sale to the customer is to operate the key or keys corresponding to such sale and register its value. While, therefore, I prefer to have the screen hide the indicator-wheels both while they are being returned to zero and while they are being moved forward to make a new indication and have so constructed my machine that the screen will operate in that manner, yet I do not wish to be limited to such an operation of it, and desire to also cover by my claims an operation in which it may be moved from in front of the wheels as soon as they are restored to zero. While, also, I have shown and described the screen as being moved positively in both directions by the cam T' upon the driving-shaft, yet, if desired, its movement in one direction may be produced by a spring or by gravity independently of the cam. Thus the power of the driving-shaft might be employed simply to lift the screen after the wheels have been returned to zero, the screen being released and permitted to drop by gravity or be moved by a spring at the beginning of the next forward movement of the shaft, as will be readily understood. On the other hand the screen might be yieldingly held in position to expose the wheel either by a spring or by its own gravity and the cam be employed simply to move the screen over the wheels at the beginning of the stroke of the shaft and to release it after the wheels had been restored to zero. My broader claims are therefore intended to cover the operation of the screen whether it be moved positively in both directions or positively in one direction only and in the opposite direction by a spring or gravity.

The next feature of my invention relates to the connection between the indicator-wheels D and their respective registering-wheels E, by which the latter are moved in one direction by or with their respective indicator-wheels and are permitted to remain stationary while the indicator-wheels are moving in the reverse direction. This is necessary in order that the amount indicated by the indicator-wheels at each operation of the machine may be added upon the registering mechanism. The connection between the indicator-wheel and its associate registering-wheel for this purpose may be by ratchet-and-pawl mechanism or in any other suitable way; but I have designed and embodied in my machine a novel clutch mechanism for this purpose. Its operation is such that each indicator-wheel is geared to its associate registering-wheel while it is moving forward to make an indication, but is thrown out of gear with it while it is being returned to zero. This clutch mechanism is shown in Figs. 1, 2, 6, and 7. As shown in Fig. 1, and as hereinbefore stated, each of the indicator-wheels D has fast upon its side or otherwise rigid with it a gear H, which meshes with a gear I, having fast upon its side the smaller gear J, which meshes with the corresponding segment G, so that the movements of the segment are through this gearing communicated to the indicator-wheel. In the case of the first and third indicator-wheels the gears H, as seen in Fig. 1, are secured directly upon the right sides of the wheels, while in the case of the second and fourth wheels the gears H are fast upon the hubs of the wheels a short distance to the left of them. Loosely mounted upon the shaft P', which supports the indicator-wheels, are four other gears U', one beside each of the gears H'. These gears U' mesh with gears V', fast upon the sides of the registering-wheels E. If this were all of the mechanism, the indicator-wheels and gears H would turn independently of the gears U', and the latter and the registering-wheels V' would remain stationary; but the clutch mechanism before referred to is employed for the purpose of connecting the gears U' to and disconnecting them from their respective gears H. By locking the gear U' to its adjacent gear H during the forward indicating movement of the wheel D the registering-wheel E will be turned with it during such movement, and by unlocking the gear U' from the gear H at the completion of the indicating movement of the wheel D the latter may be returned to zero independently of the gear U' and registering-wheel. Loosely mounted upon the shaft P' beside each gear U', Figs. 1, 2, 6, and 7, is a sliding revoluble clutch-disk W', provided on its face next to the gear U' with two diametrically-opposite pins X', Figs. 1 and 7, which fit in holes extending through the gear U', Fig. 33. The gear H is provided with ten holes arranged at equal distances apart in a circle having the same diameter as the diametrical distance between the two holes in the gear U', Fig. 34. Two of the holes in the gear H always coincide with the two holes in the gear U' when the indicator-wheel stands at zero. The pins X' are of sufficient length to extend through the gear U' and into the holes in the gear H when the disk W' is slid up against the gear U', so that when said disk is moved to such position the gears U' and H are locked together by the pins X', Fig. 30. Now by the means hereinafter described each of the clutch-disks W' is in the operation of the machine slid toward its adjacent gear U' just before the indicating movement of any of the wheels D begins, so that when such movement begins the gears U' are locked to the gears H and the registering-wheels E turn with the wheels D. After the indicating movements of the wheels D are completed the clutch-disks W' are slid back to the position shown in Fig. 1 and the gears U' thereby unlocked from the gears H, so that when the wheels D are returned to zero at the beginning of the next operation of the machine in the manner heretofore described they are independent of the gears U', and the latter and the registering-wheels E remain stationary, suitable ratchets and holding-dogs Y' Z' being applied to the registering-wheels to prevent any accidental backward movement. It will thus be seen that the clutch-disks W' are first slid up against the gears U' to cause the pins X' to lock the gears U' and H together. Then as the indicator-wheels are turned to the proper numbers to make the indication the gears U' and disks W' turn with them, the gears U' also turning the registering-wheels E corresponding distances to effect the registry. After the indication is completed the disks W' are slid away from the gears U' and the latter unlocked from the gears H and indicator-wheels. At the beginning of the next operation the gears U', disks W', and registering-wheels remain stationary while the indicator-wheels are being returned to zero, after which the disks W' are again slid up against the gears U', their pins X' enter new holes in the gears H, and the latter and the gears W' are locked together, as before described. The clutch-disks W' are given their lateral movements upon the shaft P' by arms $A^2$, mounted by their integral hubs or sleeves $B^2$ to slide laterally upon a rock-shaft $C^2$ and having forked upper and forward ends fitting in grooves in the hubs of the clutch-disks W'. (See Figs. 1, 2, 6, and 7.) As seen in Fig. 2, each of the sleeves $B^2$ has in it a cam-slot $J^2$, through which passes a pin $D^2$, fast upon the shaft $C^2$. It results from this that when the shaft $C^2$ is rocked one way the pins $D^2$ will force the sleeves $B^2$ and arms $A^2$ laterally in one direction, (though not all in the same direction,) and when the shaft $C^2$ is rocked the other way the pins $D^2$ will force the sleeves $B^2$ and arms $A^2$ in the opposite direction.

The devices employed for rocking the shaft $C^2$ are illustrated in Fig. 5, where it will be seen that the shaft has fast upon it a lever $E^2$, to whose rear end is connected a spiral spring, Fig. 2, tending to pull it upward and hold the parts in the position shown in said figure, and whose forward end contains a slot $G^2$, in which fits a pin $H^2$ upon the upper horizontal arm of a bell-crank $I^2$, hung upon a shaft $E^3$. The other arm of the bell-crank $L^2$ carries at its lower end a friction-roller $K^2$, which is in the path of travel of a segmental rim $L^2$, fast upon the cam-ring T, which has been heretofore described as fast upon the driving-shaft A. When the driving-shaft is revolved in the direction of the arrow in Fig. 5, the upper end of the rim $L^2$ comes in contact with the roller $K^2$ and forces the latter rearward, throwing the horizontal arm of the bell-crank and front end of the lever $E^2$ upward and rocking the shaft $C^2$ in the direction of the arrow. When the rim $L^2$ has forced the roller $K^2$ rearward a certain distance, its end clears the roller, and the latter thereupon rides upon the outer surface of the rim, and the bell-crank and connected parts are held in the position to which they have been moved until the opposite end of the rim has passed from under the roller K², whereupon the spring F² will draw up the rear end of the lever E² and return the shaft C² and bell-crank to normal position. The adjustment of the parts is such that the upper end of the rim L² engages the roller K² and rocks the shaft C² in the direction of the arrow just before the indicating movements of any of the wheels D begin, which causes all of the clutches to lock their respective gears U' to the adjacent gears H in the manner before described, and the rim L² is of the proper length to hold the parts in this position until after the indicating movements of the wheels D are completed, whereupon the rim L² passes from under the roller K², the spring F² resets the parts, and the clutches are slid back to normal position and the gears U unlocked from the gears H, as will be readily understood.

The next feature of my invention relates to the transfer devices between the registering-wheels, by which the revolutions of one wheel are registered upon the next higher wheel in the set. These transfer devices are illustrated in Figs. 1, 2, 5, 6, 7, 8, and 9. As shown in Figs. 1, 6, and 7, and as heretofore stated, each of the registering-wheels E has fast upon it or to its hub a ratchet Y', which is engaged by a holding-dog Z' to prevent backward movement of the wheel. Each of the ratchets Y', excepting that of the wheel on the right, is, as seen in the case of the third wheel in Fig. 6 and the fourth wheel in Fig. 7, also engaged by a transfer-pawl M², which is pivoted at its rear end to the upper end of a lever N², hung upon a shaft O², extending transversely across the machine. The lower rear end of each lever N² carries a friction-roller P², which co-operates with a cam Q², fast upon an oscillatory shaft R². A spiral spring S², connected to the upper arm of the lever N², tends to pull the upper end of the lever and the pawl M² rearward and to throw the lower end of the lever and friction-roller P² forward. The parts are normally held in the positions shown in Figs. 6 and 7 against the tension of the spring by the engagement of the friction-roller P² with the cam Q²; but when the shaft R² is oscillated in the direction of the arrow by the means hereinafter described and the cam Q² carried below the friction-roller P² the spring S² is permitted to pull the upper arm of the lever N² and pawl M² rearward. When the shaft R² and cam Q² are oscillated back to the position shown in Fig. 6, the friction-roller P² and the lower end of the lever N² are again thrown rearward and the pawl M² forward to the position shown in said figure. Upon the side of the pawl M², near its forward end, is a lug T². When the pawl is pulled rearward by the spring S², this lug rides over and rests upon the upper end of an arm U², which prevents the forward end of the pawl from dropping into engagement with the next tooth of the ratchet Y', so that when the pawl is again thrown forward it does not turn the ratchet and registering wheel. The shaft R² is oscillated forward at each operation of the machine and the pawl pulled rearward by the spring S² and then thrown forward by the cam Q² each time; but, inasmuch as it is desired to turn the ratchet Y' and registering-wheels by the pawl M² only when the preceding wheel in the set has made a complete revolution, the arm U² and lug T² are provided for the purpose of holding up the pawl M² and causing it to play idly back and forth, except at such times as a transfer is to be made. The arm U² is loosely mounted by its integral hub or sleeve V² upon a shaft W² and is rigidly connected with an arm X², mounted by its integral hub or sleeve Y² upon the shaft W² and extending upward and forward beside the preceding registering-wheel, Figs. 2 and 6. The rear sides of the arms X², which co-operate with the first, second, and third registering-wheels, are shown in Fig. 2. A side view of one of them is shown in Fig. 6, and as they are all alike the view in Fig. 6 will explain the shape and normal position of each of them. The arm X², which is beside the first registering-wheel on the left in Fig. 2, and the arm U², which is beside the second registering-wheel in said figure, are, owing to the relatively wide space between the two wheels, connected by an integral or rigid cross-bar Z², the two arms and their sleeves and the cross-bar forming a rocking-frame mounted upon the shaft W². The same is true of the arm X², which is beside the third registering-wheel, and the arm U², which is beside the fourth registering-wheel. The arm X², which is beside the second registering-wheel, and the arm U², which is beside the third registering-wheel, are so close together that they are formed integral with a single sleeve or hub mounted upon the shaft W². Projecting from the side of each of the registering-wheels, as seen in Fig. 2, is a pin A³, which co-operates with the arm X² beside such wheel. Just as the wheel completes a revolution its pin A³ strikes the forward side of the upper end of the arm X² and presses said arm rearward, thereby moving rearward the arm U² of the next succeeding wheel in the set, so that when the pawl M², co-operating with such second wheel, is pulled rearward by the spring S², as before explained, the upper end of the arm U² will not be in position to support the lug T² on the pawl; or, if the pawl has been pulled rearward by the spring S² before the revolution of the preceding wheel is completed and the arm U² thrown rearward, and the lug T² and pawl is at such time resting upon the top of the arm U², the latter will be moved from under it. In either case the pawl will drop into engagement with the next tooth of the ratchet Y', so that when it is thrown forward again upon the return movement of the shaft R² and cam Q² it will turn the ratchet and registering-wheel forward one notch and number. Spiral springs connected to pins upon the lower sides of the sleeves V² yieldingly hold the arms U² and X² in and return them to normal position, where they rest against any suitable stops. (Not shown.) The shaft R² is given its oscillatory movement by a rack B³ upon the rear arm of the bell-crank R', Fig. 5, which rack meshes with a pinion C³, fast upon said shaft. As has been heretofore explained, the horizontal arm of the bell-crank R' carries at its forward end a friction-roller S', Fig. 1, which fits within the cam-groove in the plate T', which is fast upon the driving-shaft A, as shown in Fig. 5. It results from this construction and arrangement that when the driving-shaft is revolved in the direction of the arrow the forward end of the bell-crank R' will be moved downward and the rack B³ at the upper end of the bell-crank moved forward, thereby turning the shaft R² in the direction of the arrow and carrying the cams Q² out of engagement with the friction-rollers B² on the lower ends of the bell-crank levers N². Owing to the shape and position of the cam-groove in the plate T, the rack B³ is moved forward at the beginning of the revolution of the driving-shaft A, and then remains stationary until said shaft approaches the completion of its revolution, whereupon the rack and bell-crank are moved back to the position shown in Fig. 5. It results from this that the cams Q² are moved away from the friction-rollers and the pawls M² pulled rearward by the springs S² at the beginning of the operation of the machine and are not moved back to the position shown in Figs. 6 and 7 to throw the pawls forward again until just before the completion of the operation of the machine. This affords time for the proper pawls to be set for the transfers in all cases. The cams Q² are arranged spirally upon the shaft R², as shown in Figs. 2 and 25, in such order that the cam which co-operates with the transfer-pawl of the second wheel in the set will, as the shaft R² is returned to normal position, throw forward said pawl before the pawl co-operating with the third wheel is thrown forward by its cam, and the pawl co-operating with the fourth wheel is not thrown forward until after the one co-operating with the third wheel, and so on with all the wheels, the purpose of which is to cause the transfer from one wheel to the next to be effected before the pawl of the next higher wheel actuates the pawl of the latter wheel, this being necessary to insure accurate registration at all times. The transfer devices between the fourth and fifth, fifth and sixth, and sixth and seventh registering-wheels are or may be substantially the same as those above described and need not be further explained.

The next feature of my invention relates to the printing attachment, by which the respective amounts indicated and registered are printed upon a paper strip or ticket. This part of my invention is chiefly illustrated in Figs. 1, 2, 8, 9, 17, and 18. The printing mechanism consists, primarily, of a series of type wheels or carriers, one corresponding to each of the indicator-wheels and geared to such wheel or its actuating-segment in such manner as to partake of its movements, and a printer or impression device co-operating with the type wheels or carriers to print their numbers and characters upon the interposed paper strip or ticket. I am aware that a series of type-wheels have been heretofore geared to a series of similar indicator-wheels or their actuating-segments, so as to partake of the movements of said wheels, and combined with an automatic printer, and the novelty of this particular combination in my machine resides in the manner of gearing the type-wheels to their respective indicator-wheels or actuating devices. This may be best understood by reference to Figs. 17 and 18, where it will be seen that the series of type-wheels D³ are carried upon the left-hand end of the same shaft E³ which carries the gears I J, which connect the segments to the indicator-wheels. (See Fig. 6.) Neither the type-wheels nor the gears I J (excepting the type-wheel upon the extreme left and the set of gears upon the extreme right) are mounted directly upon the shaft E³, but upon the sleeves carried by said shaft. As shown Figs. 1, 17, and 18, the type-wheels are arranged in reverse order to the indicator-wheels—that is, the indicator-wheel representing units of cents is at the extreme right of the set of indicator-wheels, while the type-wheel representing units of cents is in the extreme left of the set of type-wheels. The indicator-wheels representing tens of cents, units of dollars, and tens of dollars are respectively the second, third, and fourth wheels from the right in the set of indicator-wheels, while their corresponding type-wheels are respectively the second, third, and fourth wheels from the left in the set of type-wheels. As shown in Fig. 18, the gear J which drives the units-indicator wheel at the extreme right and the units-type wheel at the extreme left are both fast upon the shaft E³, so that they turn together, and consequently the type-wheel and indicator-wheel move in unison, the adjustment being such that when a given number upon the indicator-wheel is brought to position to be exposed at the reading-opening the corresponding number upon the type-wheel is brought to the printing-point. The second gear J, which drives the indicator-wheel representing tens of cents, is fast upon the right-hand end of a sleeve F³, loose upon the shaft E³, and the second type-wheel, representing tens of cents, is fast upon the left-hand end of said sleeve, so that said type-wheel and indicator-wheel move in unison. The third gear J, which drives the indicator-wheel representing units of dollars, is fast upon the right-hand end of a second sleeve G³, loose upon the sleeve F³ and having fast upon its left-hand end the third type-wheel, likewise representing units of dollars, so that said third type-wheel and third indicator-wheel move together. The fourth gear J, which drives the indicator-wheel representing tens of dollars, is fast upon the right-hand end of a third sleeve H³, loose upon the sleeve G³ and having fast upon its left-hand end the fourth type-wheel, representing tens of dollars, so that those wheels move in unison. It results from this arrangement of the type-wheels in a reverse order to that of the indicator-wheels and the connection of them with the respective driving-gears J by the shaft E³ and concentric sleeves F³, G³, and H³ that when in the operation of the machine any numbers upon the indicator-wheels are brought to the reading-opening to make an indication the same numbers upon the corresponding type-wheels are brought to the printing-point, and this is effected by an exceedingly simple arrangement and combination of parts, which do away with the complicated and indirect means heretofore employed for connecting the type-wheels with the indicator wheels or segments. It will of course be understood that either more or less than four wheels and corresponding driving-gears may be arranged and connected in this manner; also, that while I have shown the right-hand gear and left-hand type-wheel as fast upon the shaft E³, yet they too might be mounted upon a fourth sleeve within the sleeve F³ and the shaft be employed simply as a support for the sleeves. Furthermore, the type-wheels, instead of being themselves secured directly upon the ends of the sleeves, might be mounted upon another shaft and be driven by gears secured upon the ends of the sleeves. It will also be understood that the shaft E³ and concentric sleeves, instead of being geared both to the segments G and to the indicator-wheels D by the gears I J, might be geared to the segments alone or to the indicator-wheels alone, the segments in such case being independently geared to the indicator-wheels.

A novel feature in the type-wheels themselves consists in a new arrangement and combination of the $-type upon the fourth wheel, representing tens of dollars, which may be now explained. It will of course be understood that in machines of this class when the indicator-wheels stand with their zeros at the reading-opening the type-wheels stand with their zeros at the printing-point, so that if only part of the indicator-wheels be moved in making an indication only the corresponding type-wheels will be moved and the other type-wheels will remain stationary and their zeros will be printed upon the paper strip or ticket beside or between the numbers representing the sale, as the case may be. Thus, if the sale were ten dollars, "10.00" would be printed upon the paper strip. If it were five dollars, "05.00" would be printed. If it were twenty-five cents, "00.25" would be printed. If the 0 between the 1 and 9 upon the fourth wheel were omitted, the five-dollar sale would be printed "5.00," the twenty-five cents sale "0.25," and so on. In cases where a $-type has heretofore been employed it has in some instances been mounted upon a stationary support at the left of the printing point. In other instances a $ has been placed between the 1 and 9 on the fourth type-wheel instead of the 0 which usually occupies such space. The result of the first arrangement of the dollar-mark was that when any amount of less than ten dollars was indicated and printed a 0 would be printed, or a blank space would be left between the dollar-mark and the adjacent number or cipher upon the right. Thus, if the sale were five dollars, "$05.00" or "$5.00" would be printed; if twenty-five cents, "$00.25" or "$0.25" would be printed. The result of the second arrangement of the $ above mentioned was that when a sale amounting to more than one and less than ten dollars was made the $ would be printed immediately to the left of the figure representing dollars in proper position; but whenever a sale amounting to ten dollars or more was made no $ would be printed at all. Thus a sale of five dollars would be printed "$5," a sale of twenty-five cents would be printed "$0.25," while a sale of fifteen dollars or fifteen dollars and twenty-five cents would be printed simply "15" or "15.25." If the two arrangements before mentioned were combined—that is, if the fourth type-wheel were provided with a $ instead of a 0 between the 1 and the 9 and a stationary $ were arranged at the left of the printing-point—the result would be that a $ would always be printed whether the sale amounted to more or less than ten dollars; but the difficulty would be that when it amounted to less than ten dollars two dollar-marks would be printed at the left of the figure representing dollars, one by the $ on the fourth type-wheel and the other by the stationary $. Thus, if the sale amounted to twelve dollars and twenty-five cents, "$12.25" would be printed in proper form; but if the sale amounted to two dollars and twenty-five cents it would be printed "$2.25." My new arrangement of the dollar-marks consists in placing one of them in the space between the 1 and 9 on the fourth type-wheel and also placing a dollar-mark beside each of the figures on said wheel, but leaving a blank space beside the dollar-mark, which I place between the 1 and 9 on said wheel. Thus there are nine dollar-marks arranged in line around said wheel, one beside each of the figures thereon, with the tenth space left blank, all as shown in Fig. 17 of the drawings. The result of this new arrangement is that whenever any sale amounting to more than ten dollars is made the dollar-mark is printed immediately upon the left of the figure representing tens of dollars, and when any sale of more than one dollar and less than ten is made the dollar-mark is printed immediately upon the left of the figure representing units of dollars, and no zero or blank space is left between them. Thus, if the sale is ten dollars, "$10.00" will be printed. If the sale is five dollars, "$5.00" will be printed. If it is twenty-five cents, "$0.25" will be printed, as will be readily understood. In case the machine were provided with only three type-wheels, three indicator-wheels, and three sets of keys, to indicate only sales of less than ten dollars, then the third type-wheel would be constructed and provided with dollar-marks in the same way that the fourth wheel now is. So if the types were mounted upon segmental carriers instead of wheel-carriers, as is often the case in this class of machines, the $ upon the third or fourth wheel (as the case might be) would be placed adjacent to the type-number 1 in line with the row of type-numbers, while the latter would have the other dollar-marks placed beside them, as in the case of the wheel-carriers.

As before stated, and as shown in Fig. 1, I have placed a dollar-mark upon my fourth indicator-wheel between the 1 and 9, instead of 0, which has heretofore occupied this space, so that whenever a sale of more than one and less than ten dollars is to be indicated the dollar-mark will be exposed immediately at the left of the figure representing the units of dollars, instead of having a 0 confusingly exposed at that point. In case the machine had only three indicator-wheels, the third would have a dollar-mark instead of a zero between the 1 and 9 for the same purpose.

Under the construction and arrangement shown in Fig. 1 if the sale to be indicated amounts to ten dollars or more no dollar-mark will be exposed; but I comtemplate providing for such indications by arranging a dollar-mark upon a stationary support immediately to the left of the fourth wheel in the end of the reading-opening, as shown in dotted lines in Fig. 27, and securing to the periphery of the wheel, just to the left of the dollar-mark thereon, a laterally-projecting screen $I^3$, which, when said wheel is in normal position, (shown in Fig. 1,) will cover and hide the stationary dollar-mark. Except in the cases where sales amounting to ten dollars or more are made, the stationary dollar-mark will remain hidden by the screen $L^3$ and the dollar-mark upon the fourth wheel will be the only one exposed, and that will always be immediately upon the left of the figure representing units of dollars. When a sale of ten dollars or more is to be indicated, the movement of the fourth wheel in effecting such indication will carry the screen $L^3$ from before the stationary dollar-mark and expose the latter immediately upon the left of the figure representing tens of dollars. If only three wheels were employed, the stationary dollar-mark would be placed immediately to the left of the third wheel and the screen $L^3$ be secured to said wheel. The same result may be accomplished by making the fourth indicator-wheel (or the third, if only three are employed) wider than the others and arranging the dollar-marks thereon just as they are upon the fourth type-wheel—that is, one beside each number and one in the space between the 1 and 9, as will be readily understood.

Having now described the arrangement of the type-wheels and their connection with the indicator-wheels or actuating-segments, it will next be in order to describe the automatic printer or impression device which co-operates with the type-wheels. A platen $J^3$, Figs. 1 and 9, is supported immediately over the type-wheels by a lever $K^3$, pivoted at its left-hand end to the frame-work of the machine. It is connected to the lever by a vertical rod $L^3$, to whose lower end it is pivotally hung. The upper portion of the rod $L^3$ fits in a guideway in the lever $K^3$, Fig. 9, and a set-screw $M^3$, by which it is secured, permits it to be adjusted vertically to give greater or less pressure upon the type-wheels beneath. To facilitate this adjustment, the upper end of the rod $L^3$ is beveled and co-operates with a second set-screw $N^3$. By loosening the lower screw $M^3$ and screwing the upper one inward the rod $L^3$ may be gradually forced downward to the extent desired and then be secured in its adjusted position by tightening up the screw $M^3$ again. The pivotal connection of the impression frame or platen $J^3$ to the lever $K^3$ at the lower end of the rod $L^3$ permits the platen to adjust itself to and bear firmly upon all of the types.

The lever $K^3$ is actuated at each operation of the machine to effect the printing by the following means: To a stud or pin $Q^3$ on its right-hand end, as seen in Figs. 1 and 8, is connected the upper end of a pendent link $O^3$. (Shown in full in Fig. 8.) The lower end of this link is pivoted to the rear arm of a lever $P^3$, pivotally supported upon the frame-work, Figs. 1, 4, 7, 8, and 9. A spiral spring $R^3$, connected to the forward portion of this lever and to the frame-work, normally holds its front end in the position shown in the drawings, where it rests against the framework at $S^3$, and in which position its rear end holds up the link $O^3$, lever $K^3$, and platen $J^3$. The front end of the lever $P^3$ carries upon its right side a friction-roller $T^3$, which co-operates with a cam $U^3$, Fig. 7, fast upon the driving-shaft A beside the cam $L'$, heretofore described. When the shaft A is given a revolution, the cam $U^3$ will engage the friction-roller $T^3$ and lift the front end of the lever $P^3$ and depress its rear end and cause the link $O^3$ to pull down the right-hand end of the lever $K^3$ and effect the printing, after which the cam will pass by the roller and the spring $R^3$ will reset the parts. It will be seen that the cam $U^3$ does not engage the roller $T^3$ until the shaft A has made more than a half-revolution from its starting-point, so that the indication is made and the type-wheels properly set before the printer is actuated to do the printing.

A locking-bar $V^3$, Figs. 2, 8, and 9, supported by side arms $W^3$ upon a shaft $X^3$, is thrown into engagement with notches in the type-wheels at the beginning of the printing operation to lock the wheels from any accidental movement during such operation. Its side arm on the left projects below and forward of the shaft $X^3$, as seen in Fig. 8, into position to be engaged by the rear end of the lever $P^3$. When the cam $U^3$ lifts the front end of said lever, its rear end forces the lower end of the arm $W^3$ rearward and throws the locking-bar $V^3$ forward into the notches in the type-wheels. A spiral spring $Y^3$, Fig. 2, (shown in dotted lines in Fig. 9,) connected at its forward end to the upper end of the outer arm $W^3$ and at its rear end to a fixed point, restores the locking-bar $V^3$ to normal position after the lever $P^3$ has been released by the cam $U^3$ and reset by the spring $R^3$, as will be readily understood.

I will next describe the means for supporting the paper strip, feeding it over the type-wheels, and cutting it into separate tickets. The devices relating to this part of the machine are shown in Figs. 1, 2, 4, 7, 8, and 9. The paper strip $A^4$ is carried upon a reel $B^4$. (Shown in Figs. 4, 7, and 9, but omitted from the other figures above referred to.) From the reel $B^4$ the strip is led up through a guide-chute $C^4$, Figs. 4 and 9, between feed-rollers $D^4$ $E^4$, and thence forward over the type-wheels, above the inking-ribbon hereinafter referred to. The feed-rollers $D^4$ are driven by a gear $F^4$, Figs. 8 and 9, mounted upon a screw-stud $G^4$, projecting from the frame-work. This gear meshes with a pinion $H^4$, fast upon the inner end of the lower rollers $E^4$, Fig. 8. A pinion $I^4$, fast upon the outer end of the roller $E^4$, Fig. 2, meshes with a pinion $J^4$, fast upon the roller $D^4$, so that when the driving-gear $F^4$ is turned in the direction of the arrow upon it it revolves the feed-rollers $D^4$ $E^4$ in the direction of the arrows upon them and feeds the paper strip forward. Fast upon the side of the gear $F^4$ is a ratchet $K^4$, while loosely hung upon its pivotal stud $G^4$ is an arm $L^4$. The upper rear end of the arm $L^4$ is pivoted to a vertical link $M^4$ and carries a pawl $N^4$, which is pressed into engagement with the ratchet $K^4$ by a spiral spring $O^4$, connected at its upper end to the rear end of the pawl and its lower end to the link $M^4$. The lower end of the link is pivoted to a laterally-projecting stud upon the rear end of a lever $P^4$, which lever is pivoted near its middle to the frame-work at $Q^4$, Fig. 7. The forward end of this lever is provided with a pendent cam projection lying in the path of the cam $U^3$, heretofore described. A spiral spring $R^4$, connected at its lower end to the rear arm of the lever and at its upper end to the frame-work, yieldingly holds said lever and its connected parts in the position shown in the drawings. When in the revolution of the driving-shaft $A$ the cam $U^3$ strikes and lifts the front end of the lever $P^4$, the rear end of the latter pulls down the link $M^4$ and causes the pawl $N^4$ to turn the ratchet $K^4$ and gear $F^4$ and advance the paper strip. This occurs immediately after the printing has been effected by the engagement of the cam $U^3$ with the roller $T^3$ upon the front end of the lever $P^3$ in the manner before explained. After the front end of the strip, with the printed matter upon it, has been moved forward from the printing-point, as described, it is cut off to form a detached ticket in the manner and by the means to be now described. Pivoted at its left-hand end to the frame work at $S^4$, Figs. 1 and 13, is a knife $T^4$, which plays up and down just in front of the plate $U^4$, which is located immediately over the type-wheels $D^3$, and through the opening in which the upper sides of said wheels project, Figs. 1, 8, and 9. Between lugs or ears $V^4$ upon the forward side of the right-hand end of the knife $T^4$ is pivoted the upper end of a link $W^4$, whose lower end is pivoted to the front end of a lever $X^4$, Figs. 1 and 7, pivoted near its middle to the frame-work at $Y^4$. The lever $X^4$ has a lateral projection upon the left-hand side of its forward end, as seen in Fig. 1, and it is to this projection that the lower end of the link $W^4$ is pivoted. For this reason in the view in Fig. 7 the link is shown only in dotted lines. The rear end of the lever $X^4$ carries a friction-roller $Z^4$, lying in the path of the cam $U^3$, heretofore described. After said cam has engaged and passed the friction-roller $T^3$ upon the front end of the lever $P^3$ and effected the printing, as before explained, and after it has lifted and passed the forward end of the lever $P^4$ and actuated the feed-rollers to move forward the paper strip, as has also been explained, it comes in contact with the roller $Z^4$ and forces upward the rear end of the lever $X^4$, throwing the forward end of said lever downward and, through the link $W^4$, drawing down the right-end of the knife $T^4$ and shearing off the paper strip at the forward edge of the plate $U'$. A spiral spring connected at its lower end to the front end of the lever $X^4$ and at its upper end to the frame-work, as seen in Fig. 1, restores said lever to normal position after the cam $U^3$ has passed the roller $Z^4$. It will be understood from the above description that with the front end of the paper strip in the position shown in Fig. 9 at the beginning of the operation of the machine the indicator-wheels are first moved to the proper points to indicate the values of the operated keys and the type-wheels correspondingly set. Then the printer is actuated to effect the printing. Then the paper strip is advanced by the feed-rollers until its forward end, bearing the printed matter, projects in front of the plate $U^4$, and then the knife $T^4$ is drawn down and the portion of the strip bearing the printed matter is cut off and becomes a separate ticket, which may be given to the customer or sent to the cashier's desk with his money or otherwise used, as desired.

In addition to printing upon the paper strip or ticket the amount of the sale, I prefer to number the tickets consecutively and to print upon each its number by the same operation which prints the amount of the sale. To this end I have arranged beside the type-wheels D³, upon the same shaft E³, a set of consecutive-numbering type-wheels A⁵, Figs. 1, 2, 17, 18, and 19. These wheels may be of the usual or any suitable construction of wheels of this character, the primary or units wheel being turned one number at each operation of the machine, and each of the other wheels being turned one number at each complete revolution of its immediately-preceding wheel. In the novel construction which I have employed the four wheels of the set are all actuated by one pawl B⁵, Figs. 1, 2, 4, and 19. This pawl is pivoted at its upper forward end in a frame C⁵, Figs. 17 and 19, which is hung upon the shaft E³ by rearwardly-extending side arms D⁵ E⁵, straddling the set of wheels A⁵. Each wheel of the set has fast upon its side a ratchet F⁵, and the rear end of the pawl B⁵ is slotted to form fingers G⁵, which pass between the wheels A⁵ and engage the ratchets F⁵ of the respective wheels. Each wheel bears upon its periphery ten type numbers from 0 to 9, inclusive, and the ratchet of each wheel has ten teeth. Excepting the fourth or thousands wheel, each ratchet has nine notches (the spaces between its teeth) of uniform size, and one notch deeper than the others, as seen in Fig. 19. The notches in the ratchet of the thousands-wheel are or may be all of uniform size. The ratchets of the respective wheels decrease slightly in size from that of the units-wheels on the left in Fig. 1 to that of the thousands-wheel on the right, the former being the largest of the four and the latter the smallest. The result of this construction is that when the left-hand finger of the pawl B⁵ is in engagement with one of the nine notches of uniform size upon the units-wheel, as in Fig. 19, the other fingers of the pawl are held out of engagement with their respective ratchets. When the units-wheel has been turned until the left-hand finger engages the deep notch of its ratchet, the second finger of the pawl is permitted to engage the ratchet of the second or tens wheel and at the next movement of the pawl both wheels will be turned one notch. So when the second wheel completes a revolution and the deep notch in its ratchet is brought beneath the second finger of the pawl (the first finger being at such times always in engagement with the deep notch in the ratchet of the first wheel) the third finger is permitted to engage the ratchet of the third wheel, and so on with all the wheels employed, each being turned one number at each complete revolution of its preceding wheel. A spring H⁵ presses the pawl-fingers into engagement with the ratchets, and the frame C⁵, which carries the pawl, is vibrated at each operation of the machine to cause the pawl to turn the wheels by the following means: A rock-shaft L⁵, journaled in the frame-work, Fig. 1, has fast upon its left-hand end a rearwardly-entending arm J⁵, Figs. 4 and 19, whose rear end is pivoted to the lower end of a link K⁵, whose upper end is pivoted to an ear upon the side arm E⁵ of the pawl-carrying frame C⁵, Fig. 19. Fast upon the right-hand end of the rock-shaft, to the right of the frame-plate in which that end of it is journaled, is a rearwardly-extending arm I⁵, Fig. 7, whose slotted rear end embraces a laterally-projecting pin M⁵ upon the front end of the lever X, heretofore described. When the cam U³ engages and lifts the roller Z⁴ and rear end of the lever X⁴ in the manner before explained, the downward movement of the front end of the lever carries downward the rear end of the arm I⁵ and rocks the shaft L⁵, thereby causing the arm J⁵ to vibrate the frame C⁵ and the pawl B⁵ to turn the wheels A⁵. A spiral spring N⁵, Fig. 19, connected at its lower end to the arm J⁵ and fastened at its upper end to the frame-work, restores the parts after the cam U³ passes the roller Z⁴. A series of spring-pressed pawls confined in a housing O⁵ upon the frame-plate P⁵, Figs. 1 and 19, engage the ratchets of the respective wheels A⁵ and prevent said wheels from turning backward.

I am aware that it is old in machines of this class to combine a set of consecutive-numbering type-wheels with the set of type-wheels which print the amounts of the sales and both co-operating with the same impression device, so that at each operation of the machine the amount of the sale and its consecutive number will be printed upon the paper strip before the ticket is cut off; but in such prior machines with which I am familiar the two sets of wheels are not arranged upon the same axis, so that the number of the sale and the amount of it will be printed in line or parallel with each other, as in my machine, but are arranged upon axes at right angles to each other, so that the consecutive number and the amount of the same are printed in lines at right angles to each other.

It is often desirable to print upon the ticket some other matter than its consecutive number and the amount of the sale, such as the name of the proprietor, direction to pay the cashier, &c. For this purpose I provide a stationary type-plate Q⁵, Fig. 9, mounted upon the upper side of the plate U⁴ near its rear edge. Upon this type-plate in the machine from which the accompanying drawings have been made I have placed in type-letters the name of the proprietor and the words "Please pay cashier," while immediately to the right of the printing-point of the wheels A⁵, between said wheels and the wheels D³, I have placed "No." in type-letters, so that a ticket of the style shown in Fig. 29 is printed at each operation of the machine.

I will now describe the means for supporting the inking-ribbon, moving it across the type wheels and plates, and automatically reversing its direction of movement. (Shown in Figs. 1, 4, 8, 9, 13, 14, 15, and 16.) The ribbon R⁵ is carried upon spools S⁵ T⁵, mounted in a supplemental frame U⁵, secured upon the left-hand side of the frame-work, as seen in Figs. 1 and 4. The ribbon is led from the upper side of the upper spool S⁵ downward beneath a roller or guide-rod V⁵, Fig. 14, thence to the right across the top of the printer J³, Figs. 1, 9, and 14, thence over a second guide-rod W⁵, Figs. 8 and 14, thence down around a third rod X⁵, thence to the left across the type wheels and plates beneath the printer, over a fourth rod Y⁵, and to the under side of and around the lower spool T⁵. Fast upon the hubs of each of the spools S⁵ T⁵, upon the forward side of the front plate of the frame U⁵, Figs. 4 and 13, is a ratchet A⁶ B⁶, with which co-operate two pawls C⁶ D⁶ upon the opposite arms of a plate Z⁵. The latter plate is pivoted at its right-hand end to the upper corner of the widened left-hand end of the knife T⁴, heretofore described, and as said knife is itself pivoted to the frame-work at the lower corner of its left-hand end its vibrations up and down will vibrate the plate Z⁵ laterally and cause the pawls C⁶ D⁶ to turn the ratchet and spools. In the position of the parts shown in Figs. 13 and 14 the upper pawl is in engagement with the ratchet of the upper spool, so that at each operation of the machine the ribbon will be drawn from the lower spool across the types and wound upon the upper spool. When a given portion of the ribbon has been wound upon the upper spool, the plate Z⁵ will be rocked on its pivot by the means hereinafter described and the lower pawl thrown into engagement with the lower ratchet, whereupon the succeeding operations of the machine will wind the ribbon from the upper spool onto the lower one. The plate Z⁵ is yieldingly held in each of its adjusted positions with the one or the other pawl in engagement with its ratchet by springs hereinafter referred to.

The means for rocking the plate Z⁵ to disengage one pawl from its ratchet and engage the opposite pawl with the other ratchet, and which I term a "shifter" or "shifting" device, may be described as follows: Located between the two side plates of the frame U⁵, as seen in Figs. 4 and 14, is a recessed block or casing E⁶, fastened at its inner end upon a rock-shaft F⁶, journaled at ends in the side plates of the frame U⁵. Passed through guideways in the block E⁶ are two rods G⁶ H⁶ of equal length and connected at their opposite ends by cross-pieces I⁶. Surrounding the rod H⁶ upon opposite sides of the block E⁶ are two spiral springs J⁶, each confined between the side of the block and the adjacent cross-piece I⁶. These springs tend to maintain the rods G⁶ and H⁶ with their opposite ends equally distant from the middle of the block. When they are forced in either direction through the block, one or the other of the springs J⁶ is put under tension. Fitted in a transverse recess within the block E⁶, as shown in Fig. 15, (which is a sectional view transversely through the block E⁶ longitudinally of the rod G⁶ between the latter and the rod H⁶,) is a hollow block K⁶, through which the rod G⁶ passes. This block K⁶ is capable of lateral play in the recess in the block E⁶ and is normally pressed to the left therein by a spiral spring L⁶, confined within a hollow boss M⁶ upon the side of the block E⁶ and bearing against the right-hand side of the block K⁶. Extending across the recess in the block K⁶, through which the rod G⁶ passes, is a pin N⁶, which co-operates with inclined shoulders O⁶ at the opposite ends of a cut-out space in the side of the rod G⁶. Upon the left-hand side of the block K⁶, projecting out through the side of the block E⁶, is a stud or pin P⁶, which is adapted to enter holes or depressions in the inner face of the adjacent side plate of the frame U⁵. When the rod G⁶ is pushed downward a sufficient distance, the upper shoulder O⁶ will bear against the pin N⁶ and force the block K⁶ to the right in its recess against the pressure of the spring L⁶ and withdraw the pin P⁶ from engagement with the hole in the plate of the frame U⁵, before referred to. A like result will be produced by pushing the rod G⁶ upward a sufficient distance. The cross-pieces I⁶ at the opposite ends of the rods G⁶ and H⁶ are adapted to bear against the ribbon wound upon the spools S⁵ and T⁵. With the parts in the position shown in Figs. 13, 14, and 15 it will be seen that as the ribbon is gradually wound upon the upper spool S⁵ it will force the rods G⁶ and H⁶ downward and put the upper spring J⁶ under tension, the block E⁶ being held from downward movement by the engagement of the pin P⁶ with a hole in the frame U⁵, as above described. When the rods G⁶ and H⁶ have been forced downward by the ribbon on the spool S⁵ until the upper shoulder O⁶ on the rod G⁶ engages the pin N⁶ and forces the block K⁶ to the right and disengages the pin P⁶ from its detaining-hole, the block E⁶ will be released and the upper spring J⁶, which has been put under tension, will force the outer end of said block downward and bring the lower cross-piece I⁶ into position to bear upon the ribbon upon the lower spool T⁵. As before stated, the block is fast upon the rock-shaft F⁶, so that when the block is thrown downward the shaft is rocked. Secured upon the outer end of the shaft F⁶ in front of the frame U⁵, between the opposite pawl-arms of the plate Z⁵, is a block Q⁶. A flat spring R⁶, fastened at its right-hand end to the plate Z⁵, passes at its left-hand end through a slit in a flange on the block Q⁶. When the shaft F⁶ is rocked in the manner above described, the block Q⁶ is rocked with it and its outer end thrown downward, and the spring R⁶, connecting it with the plate Z⁵, will rock the latter downward and disengage the pawl C⁶ from the upper ratchet and engage the pawl D⁶ with the lower ratchet. A second flat spring S⁶ is secured at its left-hand end to a pivoted plate T⁶, which carries holding-pawls U⁶ and V⁶, engaging the upper and lower ratchets, respectively. The right-hand end of the spring S⁶ passes through a recess in the block Q⁶, as seen in Fig. 16, and is confined in a slit in its opposite end, and when the block is rocked the spring causes the plate T⁶ to rock with it and disengage the pawl U⁶ from the upper ratchet and engage the pawl V⁶ with the lower ratchet. It will thus be seen that when a given amount of ribbon has been wound from one spool onto the other the plate Z⁵, carrying the connecting-pawls, and the plate T⁶, carrying the holding-pawls, will be shifted and the ribbon wound back upon the empty spool. When the latter has been filled to a given extent, the pawls will be again shifted and the ribbon wound back upon the other spool.

So far as I am aware I am the first to combine the actuating-pawls of two inking-ribbon spools with an automatic shifter controlled by the ribbon upon the spools and operating to shift the pawls when a given amount of ribbon has been wound from one spool onto the other, and I desire to secure as my invention this broad combination regardless of the particular construction and arrangement of the parts which I have shown and described.

The next feature of my invention relates to the means for supporting, locking, unlocking, and propelling the money-drawer. (Shown in Figs. 1, 2, 3, 4, 5, 6, and 7.) As shown in Figs. 1 and 2, the drawer W⁶ has secured to its opposite sides at their upper edges two angle-irons X⁶. These angle-irons extend the entire length of the drawer, and their horizontal portions rest upon rollers Y⁶, mounted upon studs projecting inward from the side frames of the machine. Extending from front to rear of the machine beneath the drawer and midway between its sides, as shown in Fig. 6, is a guide-rod Z⁶. This rod is supported at its rear end by a bracket A⁷ and at its forward end by a bracket B⁷, a perspective view of the latter being shown in Fig. 31. Fastened upon the rear side of the drawer is a plate C⁷, a detail perspective of the lower portion of which is shown in Fig. 32. The lower slotted end of this plate embraces and rests upon the guide-rod Z⁶, the latter affording the support for the rear portion of the drawer, while the rollers Y⁶ support its forward portion. A rubber buffer mounted upon the rod Z⁶ in front of the rear bracket A⁷ receives the shock of the drawer when the latter is closed. When it is desired to remove the drawer from the machine, it is unlocked, as hereinafter explained, and pulled forward until the plate C⁷ clears the forward end of the guide-rod Z⁶ and bracket B⁷, whereupon the rear end of the drawer can be lifted and the drawer removed. The lock for the drawer consists of a lever E⁷, loosely hung upon a shaft F⁷, with its shouldered rear end engaging the rear wall of the drawer, as seen in Fig. 6. A pin G⁷ upon the vertical arm of the lever E⁷ projects laterally into the path of the rear arm of a bell-crank H⁷, also loosely hung upon the shaft F⁷. Upon the upper end of the forward arm of this bell-crank is mounted a friction-roller I⁷, located in the same vertical plane as a cam J⁷, fast upon the driving-shaft A. When the latter is revolved, the cam J⁷ bears against the friction-roller I⁷ and presses the forward arm of the bell-crank downward, thereby throwing its rear end forward against the pin G⁷ upon the vertical arm of the lever E⁷ and lifting the rear end of the lever out of engagement with the drawer, whereupon the latter is free to open.

The drawer may be automatically thrown open by any suitable spring; but I have devised a novel combination of a spring with the drawer and its unlocking mechanism, which may be now described. In the form shown in Fig. 6 the drawer-propelling spring consists of a spring-rod K⁷, fastened at its upper end in a sleeve loosely mounted upon the shaft R² and having its lower end extending down behind the drawer. The upper end of the rear arm of the bell-crank H⁷ carries a grooved friction-roller L⁷, Figs. 2 and 6, against the forward side of which the spring-rod K⁷ rests when the drawer is closed. When the driving-shaft A is revolved in the operation of the machine, the cam J⁷ rocks the bell-crank H⁷ some distance before the rear arm of the latter engages the pin G⁷ and lifts the locking-bar E⁷ out of engagement with the drawer. This locking of the bell-crank before the drawer is released causes the roller L⁷ at the upper end of its rear arm to bend forward the middle portion of the spring-rod K⁷ and put the same under tension, so that when the drawer is released the spring-rod will throw it open. As the driving-shaft continues to revolve the tail of the cam J⁷ will pass the friction-roller I⁷ on the forward arm of the bell-crank before the driving-shaft reaches normal position, whereupon the bell-crank will fall back to the position shown in Fig. 6. The spring-rod K⁷ is then free to swing back to the position shown in said figure, so that it offers no resistance, or, if desired, only very slight resistance to the closing of the drawer.

Heretofore in machines of this class the money-drawer has been thrown open by springs, which were put under tension solely by the closing of the drawer, and, so far as I am aware, I am the first to employ for this purpose a spring which is not put under tension or under only slight tension by the closing of the drawer, but which is put under tension by the operation of the machine preceding the release of the drawer. This feature of my invention, therefore, in its broader scope is in no way restricted to my present machine or to the construction and arrangement of the parts illustrated in the drawings and above described, but contemplates, broadly, the combination of the drawer and its lock with a spring which is put under tension prior to the release of the drawer by the driving or actuating device of the machine whether such device consists of a revoluble shaft, an oscillating shaft, a handle, or something else.

A rod M⁷, mounted in a suitable guideway or housing N⁷, secured upon the front side of the rear wall of the drawer, Figs. 2, 6, and 28, is pressed upward by a spiral spring within said housing and extends above the horizontal plane of the lower side of the front cross-piece O⁷ of the frame-work, and by engagement with the cross-piece O⁷ prevents the drawer being thrown too far outward by the spring. A horizontal pin P⁷, secured to the rod and projecting forward through a slot in the housing N⁷, affords a means for depressing the rod M⁷ below the cross-bar O⁷ when it is desired to entirely remove the drawer.

A gong A⁹, Figs. 2, 3, and 5, is sounded at each operation of the machine by a hammer B⁹. The hammer is pivotally supported by a sleeve C⁹ upon a stud D⁹, projecting inward from the side frame of the machine, Fig. 5. A spiral spring E⁹, connected at its rear end to the frame-work and at its forward end to a lug upon the sleeve C⁹, tends to throw the hammer against the gong. A rod F⁹, confined at its rear end in a guide-hole in the sleeve C⁹ by a set-screw G⁹, projects forward into the path of a pin H⁹ upon the outer side of the cam-plate T upon the shaft A, as heretofore described. When the driving-shaft is revolved, the pin H⁹ strikes and depresses the front end of the rod F⁹, thereby moving the hammer B⁹ away from the gong A⁹ against the tension of the spring E⁹, and when the pin passes beyond the end of the rod the spring throws the hammer against the gong. By loosening the set-screw G⁹ and moving the rod F⁹ in one direction or the other the pin H⁹ may be caused to clear its forward end and sound the gong at an earlier or a later point in the operation of the machine, as desired. A screw I⁹, passed through the side frame of the frame-work from the outside, Figs. 2 and 5, may be screwed inward until its inner end interposes between the hammer and gong and prevents the sounding of the latter.

As stated in the early part of the specification, the power to operate the machine may be applied to the driving-shaft A by any suitable means, and in Figs. 1, 2, and 3 a handle B, fastened upon said shaft, is shown for that purpose. This handle carries at its lower end upon a laterally-projecting spindle Q⁷, Fig. 12, the usual grasping-knob R⁷. In a bore in the left-hand portion of the spindle is fitted a sliding rod S⁷, between the right-hand end of which and the inner end of the bore is confined a spiral spring T⁷, which normally forces the rod S⁷ to the left, in which position the end of the rod projects through the vertical plane of the outer end of a stud or stop U⁷, fast upon the side of the frame-work, Figs. 1, 2, and 11. The rod S⁷ has a slot V⁷ cut through it near its middle, and a pin W⁷ is passed through the rod transversely across said slot. This pin co-operates with a beveled notch or shoulder on a rod X⁷, fitted in a suitable guideway and extending through the slot V⁷ in the rod S⁷. The slot X⁷ is provided at its outer end with a thumb-piece Y⁷. In the normal position of the parts the outer end of the rod S⁷ rests immediately behind the stop-lug U⁷. When it is desired to operate the machine, the operator grasps the knob R⁷ and with his thumb presses in the rod X⁷, whereupon the inclined shoulder on the latter, bearing against the pin W⁷, will force the rod S⁷ to the right against the pressure of the spring T⁷ and withdraw its outer end from the plane of the stop U⁷, whereupon the handle is free to move forward.

I am aware that it is old in this class of machines to provide the handle with a sliding rod whose end co-operates with a stop-lug, such as U⁷, upon the frame; but in the prior constructions with which I am familiar the end of the rod was withdrawn from the stop-lug to permit forward movement of the handle by sliding the grasping-knob itself to the right. The objection to this construction is that the operator is liable to inadvertently hold the knob in that position during the entire operation of the machine, or, if he does not do that, he is liable to accidentally move it to that position during the operation of the machine, so that when the handle comes around to normal position the end of the rod will not be in position to engage the stop-lug upon the frame and the handle will be moved too far. In the construction which I employ the grasping-knob of the handle does not move laterally at all, and the rod S⁷ is withdrawn from the plane of the stop-lug U⁷ solely by pressure upon the thumb-piece Y⁷ of the rod X⁷. This pressure can be conveniently applied only when the handle is in approximately its normal position of rest. After it has been moved from such position in the operation of the machine the thumb of the operator slips off the end of the piece Y⁷, and the spring T⁷ immediately throws the rod S⁷ to the left, and there is no danger then of its being moved accidentally to the right again.

While, as above described, the power may be applied to the driving-shaft by a handle fastened thereto, yet I propose to drive this shaft in my improved machine by an electric motor, and the combination of such motor with a machine of this class constitutes the next feature of my invention. The motor, of any usual or suitable construction, is geared to the driving-shaft of the machine by a train of speed-reducing gears. The electric circuit is closed upon the motor by the operator through any suitable contrivance to start the machine, and is automatically opened or switched from the motor to stop the machine when the shaft has been moved a predetermined distance—in my present machine when it has been turned a complete revolution. The motor may be located in an open circuit and a circuit-closer be employed to close the circuit to start the machine and to automatically open it to stop the machine, or a closed circuit may be employed with the motor normally out of the circuit and a switch be used to place the motor in circuit to start the machine and to cut it out of the circuit to stop the machine. In such case the switch would be operated by the clerk in any suitable manner to start the machine and would be arranged to operate automatically to stop the machine when the shaft has been given the desired movement.

In the construction illustrated in the drawings an open circuit and a circuit-closer are employed, and may be now described. As shown in Fig. 10, the driving-shaft A has fast upon it a gear-wheel $A^8$, and the latter has fast upon its inner side a circular rim $B^8$ of slightly less diameter than the gear, as shown by the dotted lines in Fig. 10. The gear $A^8$ meshes with a pinion $C^8$, fast upon the hub of a gear $D^8$, mounted upon the frame-work, and the gear $D^8$ meshes with a pinion $E^8$, fast upon the shaft $F^8$ of an electric motor $G^8$. (Shown in dotted lines.) $H^8$ $I^8$ are the circuit-wires through which the electric current from any suitable source of supply passes. Interposed in the wire $I^8$ at $J^8$ is a circuit-closer consisting in this instance of a suitably supported and insulated stationary contact-plate $K^8$ and a pivoted contact-plate $L^8$, likewise insulated and arranged to be swung up into contact with the plate $K^8$ to close the circuit. Pivoted to the frame-work at $N^8$ is a lever or key $O^8$, which carries at its rear end a block $P^8$, whose lower pointed end rests upon the rim $B^8$ on the gear $A^8$, and whose upper end is adapted to engage and lift the plate $L^8$ when the front end of the lever $O^8$ is depressed. The block may be an integral part of the lever $O^8$, in which case it will be insulated from the plate $L^8$ in some suitable way to prevent the current from escaping to the machine, or the whole block may be made of some non-conducting substance for the same purpose. To the front end of the lever $O^8$ is pivoted the lower end of a rod $R^8$, carried in a suitable guide-lug upon the frame-work and having coiled around it, between said lug and a push-button $M^8$ upon its upper end, a spiral spring $S^8$, which presses the rod and front end of the lever $O^8$ upward and yieldingly holds the lower pointed end of the block $P^8$ in contact with the rim $B^8$. When the parts are in their normal position of rest, as shown in Fig. 10, the lower end of the block $P^8$ rests in a notch $Q^8$ in the rim $B^8$, the abrupt shoulder of the notch abutting against its forward side. When the rod $R^8$ is depressed, the block is lifted out of the notch and the plate $L^8$ is swung up into contact with the plate $K^8$ and the circuit closed. The motor thereupon starts and drives the gear $A^8$ in the direction of the arrow, carrying the notch $Q^8$ from under the block $P^8$, so that when the rod $R^8$ is released the lower end of the block rides upon the periphery of the rim $B^8$, and the plate $L^8$ is held up in contact with the plate $K^8$ and the circuit kept closed until as the gear completes a revolution the inclined side of the notch $Q^8$ is brought under the lower end of the block $P^8$, whereupon the plate $L^8$ is gradually lowered out of contact with the plate $K^8$ and the circuit opened, whereupon the motor stops and the gear $A^8$ is brought to rest with the shoulder of its notch against the block $P^8$, as shown in Fig. 10.

For the purpose of preventing the rod $R^8$ being depressed and released so quickly that the pointed end of the block $P^8$ will drop back into the notch $Q^8$ before the motor can get started and begin to turn the gear $A^8$, I provide means for starting the gear by the depression of the key itself, so that the notch $Q^8$ is always carried from under the block $P^8$ when the key is depressed and the block can never drop back into the notch. The means shown in the drawings for giving this start to the gear consists of a pendent extension $T^8$ of the front end of the lever $O^8$, whose lower end is rounded or beveled upon its rear side and is adapted, when the rod $R^8$ is depressed, to strike a pin $U^8$, projecting laterally from the side of the gear $A^8$, and to thereby force the upper side of the latter rearward just after the pointed end of the block $P^8$ has been lifted above the shoulder of the notch. Any other suitable means for starting the gear by the same positive movement which releases it or closes the circuit may be employed without departing from my invention.

From the above description it will be understood that when a sale is made all that the clerk has to do is to push in the proper key or keys and then depress the button $M^8$ on the rod $R^8$, whereupon in the complete machine which I have organized and herein described the indication and registration will be made, the gong sounded, the cash-drawer unlocked and thrown open, and a ticket printed with the amount of the sale and its consecutive number will be cut from the paper strip and fed out of the machine.

So far as I am aware I am the first to combine the driving-shaft of an indicating and registering machine with an electric motor, an electric circuit, either open or closed, and a circuit-closer or switch operated by the clerk to close the circuit or switch the motor into it to start the machine and operating automatically to open the circuit or switch the motor out of it to stop the machine when the driving-shaft has been moved a predetermined distance. Such being the case, I desire to secure as my invention such broad combination regardless of the character of the machine itself or the particular construction and arrangement of the devices employed. For instance, this feature of my invention is applicable to a number of machines with which I am familiar, in which the devices interposed between the driving-shaft and indicators and register for the purpose of transmitting the proper portions of the movement of the shaft to such parts are wholly different from the corresponding devices employed in my machine, and it is evident that the devices which may be employed for closing and opening the circuit for switching the motor into and out of the circuit may be widely varied by those familiar with the art without departing from my invention.

For the purpose of preventing too rapid revolution of the driving-shaft, with consequent danger of jarring the machine or breaking some of the parts, I have combined with it a retarding device consisting of a cylinder $W^8$, closed at both ends and containing a liquid, such as glycerine. The piston is arranged either not to fit the cylinder snugly or is provided with one or more perforations, so that it can move up and down therein slowly as the liquid escapes from in front to the rear of it, but cannot move rapidly. The rod $X^8$ of this piston extends up through the upper head of the cylinder and is pivoted to the forward end of a lever $Y^8$, which is pivoted near its middle to the frame-work, and at its rear end is provided with a slot embracing a friction-roller mounted upon a stud $Z^8$, located eccentrically upon the left-hand end of the driving-shaft A, as seen in Fig. 8. When said shaft is revolved, the piston within the cylinder $W^8$ is moved up and down, and the resistance offered by the liquid to its rapid movement, as before explained, prevents a too rapid movement of the driving-shaft.

It is often desirable in this class of machine to prevent the operation of the machine while the money-drawer stands open, and to thereby compel the clerk to close the drawer after each operation. I have provided for this purpose an automatic lock, which prevents forward movement of the driving-shaft from normal position while the drawer stands open and releases it when the drawer is closed. This lock is shown in Figs. 2 and 8 and consists of a lever $J^9$, loosely hung on the shaft $F^7$ and resting at its rear end upon the top of the rear wall of the drawer. Its upper forward end is provided with a hook which co-operates with a pin $K^9$, fast upon the driving-shaft A, or the hub of one of the arms L, fast on said shaft. When the drawer is closed, it holds the lever in the position shown in Fig. 8; but when it is open the rear end of the lever falls by gravity and the hook at its opposite end is thrown into the path of the pin $K^9$, so that the shaft cannot turn forward beyond the position shown in Fig. 8. When the drawer is pushed in again, its rear wall strikes the rear end of the lever $J^9$ and moves the latter back to the position shown in Fig. 8, throwing its front end downward and unlocking the shaft.

Having thus fully described my invention, I claim—

1. The combination of the segments, the indicator-wheels geared thereto, the driving-shaft, the pawl-supports fast thereon, the pawls, each provided with the two oppositely-inclined lugs, forming a flaring mouth, and the keys and stationary trips co-operating with the pawls in the manner described.

2. The combination of the segments G, the indicator-wheels D, geared thereto, driving-shaft A, arms L, pawls M, each provided with the two oppositely-inclined lugs $a\ a'$, the spring-catches $a^2$, wiper-blocks $b$, keys C, and trips N, substantially as described.

3. The combination of the segmental guides V W, the keys C, radially mounted therein and provided with the transverse pins $B'$, the guide-rib $c$, and the sliding locking-blocks $C'$, having beveled corners and slotted under sides embracing the guide-rib $c$ and co-operating with the pins $B'$ in the manner described.

4. In a registering-machine, the combination of the indicator-wheels, the revoluble driving-shaft, means for connecting said shaft with and disconnecting it from said wheels, and means operated by the driving-shaft to positively return the indicator-wheels to zero at the beginning of the forward movement of the shaft.

5. In a registering-machine, the combination of the indicator-wheels, the segments geared thereto, the driving-shaft, means for connecting the shaft with and disconnecting it from the segments, the oscillatory shaft, the gears loose upon said shaft and movable with the indicator-wheels, means for causing the gears to turn the shaft with them during the indicating movement of the wheels and for causing the shaft to carry the gears with it when it returns to normal position, a pinion fast upon said shaft, a rack meshing with the pinion, and a cam actuated by the driving-shaft to move the rack in one direction, substantially as described.

6. The combination of the indicator-wheels, the segments geared thereto, the revoluble driving-shaft, means for connecting the shaft with and disconnecting it from the segments, the oscillatory shaft, the gears loose upon it and movable with the indicator-wheels, the arms fast upon it and co-operating with the pins upon the gears, the pinion fast upon it, the rack meshing with the pinion, and the cam upon the driving-shaft for moving said rack in one direction, substantially as described.

7. In a registering-machine, the combination of the indicator-wheels, the segments geared thereto, the driving-shaft, the pawls carried by supports fast upon said shaft, the keys and stationary trips co-operating with the pawls, and means operated by the driving-shaft to positively reset the indicator-wheels at the beginning of the forward movement of said shaft.

8. The combination of the indicator-wheels D, segments G geared thereto, driving-shaft A, arms L, fast thereon, pawls M, carried by the arms L, keys C, trips N, oscillatory shaft $D'$, arms $F'$ fast thereon, gears $E'$, loose thereon, provided with pins $G'$ and geared to the segments G and wheels D, pinion $H'$, fast upon shaft $D'$, rack $I'$, meshing with pinion $H'$, and cam $L'$, fast on driving-shaft A for moving rack $I'$, substantially as described.

9. In an indicating-machine, the combination, with the indicator-wheels and their driving-shaft, of an automatic screen operated by such shaft to hide the indicator-wheels while they are returning to zero and to expose them before said shaft completes its movement.

10. In an indicating-machine, the combination, with the indicating-wheels and the driving-shaft, of an automatic screen movable over the indicator-wheels at the beginning of the forward movement of the shaft and moved from over them by a cam upon said shaft before the latter completes its movement.

11. In an indicating-machine, the combination, with the indicator-wheels and the driving-shaft, of a screen moved by a cam upon said shaft to a position in front of the indicator-wheels at the beginning of the forward movement of the shaft and moved away from such position by the cam shortly before the shaft completes its movement.

12. In an indicating-machine, the combination of the indicator-wheels, the driving-shaft, means for connecting said shaft with and disconnecting it from said wheels, means for returning the indicator-wheels to zero at the beginning of the forward movement of the driving-shaft, a movable screen for hiding said wheels while they are returning to zero, and a cam for operating said screen.

13. In an indicating-machine, the combination of the indicator-wheels, the driving-shaft, means for connecting said shaft with and disconnecting it from said wheels, means for returning the wheels to zero at the beginning of the forward movement of the driving-shaft, and an automatic screen movable over the indicator-wheels at the beginning of the forward movement of the shaft and moved from over them by a cam upon said shaft before the latter completes its movement.

14. The combination of the indicator-wheels D, driving-shaft A, movable screen M', cam T', and connections between the cam and screen.

15. In a registering and indicating machine, the combination of the indicator-wheels, the actuating-segments geared thereto, the driving mechanism capable of connection with and disconnection from the segments, the registering-wheels, the driving-gears for the latter, arranged beside the indicator-wheels, and the sliding clutches for locking said gears to the indicator-wheels, substantially as described.

16. In a registering and indicating machine, the combination of the indicator-wheels, the actuating-segments geared thereto, the driving-shaft, the pawls supported by said shaft and co-operating with the segments, the keys and trips co-operating with the pawls, the registering-wheels, their driving-gears arranged beside the indicator-wheels, the sliding clutches for locking said gears to the indicator-wheels, and the cams for operating said clutches actuated by the driving-shaft, substantially as described.

17. In a registering and indicating machine, the combination of the indicator-wheels D, the registering-wheels E, the driving-gears U' for the latter, arranged beside the wheels D, the sliding clutch-disk W', provided with locking-pins X', adapted to enter holes in the gears U', the shifter-arms $A^2$ for the clutch-disks, loosely mounted upon a rock-shaft $C^2$ by sleeves $B^2$, provided with cam-slots $J^2$, the pins $D^2$, projecting from the shaft $C^2$ through the slots $J^2$, and the connections between the driving-shaft A and shaft $C^2$ for oscillating the latter, substantially as described.

18. In a registering-machine, the combination of the wheels E, provided with pins $A^3$, ratchets Y', the transfer-pawls $M^2$, provided with lugs $T^2$, the sets of rigidly-connected arms $U^2$ and $X^2$, the former co-operating with the lugs $T^2$ on the pawls $M^2$ and the latter with the pins $A^3$ on the wheels E, the pawl-actuating levers $N^2$, and the cams $Q^2$, fast upon the rock-shaft $R^2$, substantially as described.

19. The combination of the type-wheels driven by the adjacent ends of the series of concentric sleeves, the segments geared to said sleeves, the main driving-shaft, and means for connecting said shaft with and disconnecting it from the segments, substantially as described.

20. The combination of the type-wheels fast upon the adjacent ends of the series of concentric sleeves, the segments geared to said sleeves, the indicator-wheels arranged in reverse order to the type-wheels and geared to the segments, the main driving-shaft, and means for connecting said shaft with and disconnecting it from the segments, substantially as described.

21. In a cash-register, the combination of three or more wheels arranged side by side, each bearing a series of numbers representing units from 1 to 9, inclusive, the first and second of said wheels at one side of the series bearing a 0 in the space between the 1 and 9, and the last wheel at the opposite side of the series bearing a $ in such space and having also a $ beside each of its numbers.

22. In a cash-register, the combination of three or more type wheels or carriers arranged side by side, each bearing a series of type-numbers representing units from 1 to 9, inclusive, the first and second of said wheels at one side of the series bearing a 0-type in the space adjacent to the type-number 1, and the last wheel at the opposite side of the series bearing a $-type in such space and having also a $-type beside each of its numbers, and a printer co-operating with said type wheels or carriers, whereby the $ is always printed immediately to the left of the left-hand number or cipher of the series, substantially as described.

23. The combination of an indicator-wheel bearing upon its periphery a series of numbers representing units from 1 to 9, inclusive, and having a $ in the space immediately between the 1 and 9, a stationary $ upon a support beside the wheel, and a screen secured to the wheel and arranged to hide the stationary $ when the wheel is in its normal position.

24. The combination of the four indicator-wheels, each bearing upon its periphery a series of numbers representing units from 1 to 9, inclusive, three of said wheels bearing a 0 in the space immediately between the 1 and 9 and the fourth having a $ in such space, a $ upon a stationary support beside the fourth wheel, and a screen carried by the fourth wheel and covering the stationary $ when the fourth wheel is in normal position.

25. The combination of an indicator-wheel bearing upon its periphery a series of numbers representing units from 1 to 9, inclusive, and a type wheel or carrier geared to said indicator-wheel, bearing upon its periphery a series of type-numbers representing units from 1 to 9, inclusive, and having a $-type in the space immediately between the 1 and 9 and also a $-type beside each of its type-numbers, and a platen co-operating with said type wheel or carrier, substantially as described.

26. The combination of the four indicator-wheels, each bearing upon its periphery a series of numbers representing units from 1 to 9, inclusive, and four type wheels or carriers geared to said indicator-wheels, each of said type-wheels bearing upon its periphery a series of numbers representing units from 1 to 9, inclusive, three of said wheels having an 0 in the space immediately between the 1 and 9 and the fourth having a $-type in such space and also a $-type beside each of its type-numbers, and a platen co-operating with said type wheels or carriers, substantially as described.

27. The combination of the feed-rollers $D^4$ $E^4$, driving-gear $F^4$, provided with ratchet $K^4$, arm $L^4$, pawl $N^4$, link $M^4$, lever $P^4$, cam $U^3$, and driving-shaft A, substantially as described.

28. The combination of the wheels $A^5$, provided with ratchets, the pawl $B^5$, hung in a movable frame $C^5$, the rock-shaft $I^5$, an arm $J^5$, fast upon said shaft and connected to the frame $C^5$, a second arm $L^5$, fast upon the shaft $I^5$, a lever $X^4$, connected to the arm $L^5$, the driving-shaft A, and the cam $U^3$, fast thereon and co-operating with the lever $X^4$, substantially as described.

29. In a cash register and indicator, the combination of the spools $S^5$ $T^5$, ratchets $A^6$ $B^6$, pawls $C^6$ $D^6$, rock-shaft $F^6$, hollow block $E^6$, fast thereon, rods $G^6$ $H^6$, passed through block $F^6$ and connected by cross-pieces $I^6$, springs $J^6$, block $K^6$ within block $E^6$, provided with projecting pin $P^6$ and transverse pin $N^6$, spring $M^6$, and block $Q^6$, fast on shaft $F^6$ and connected to plate $Z^5$, substantially as described.

30. In a cash register and indicator, the combination of a money-drawer, its lock, and a propelling-spring, which is put under tension by the indicating and registering operation of the machine preceding the release of the drawer.

31. In a cash register and indicator, the combination of the driving mechanism or actuating device, a money-drawer, a lock therefor operated by the driving mechanism to release the drawer, and a propelling-spring for the drawer put under tension by the driving mechanism prior to the release of the drawer.

32. In a cash register and indicator, the combination of a revoluble shaft, a money-drawer, a lock for the latter actuated by a cam upon the shaft to release the drawer, and a propelling-spring put under tension by a cam upon the shaft prior to the release of the drawer.

33. The combination of the driving-shaft A, money-drawer $W^6$, lock $E^7$, spring $K^7$, bell-crank $H^7$, and cam $J^7$.

34. In a cash register and indicator, the combination of the drawer $W^6$, provided with the supporting-plates $X^6$, the rollers $Y^6$, the rod $Z^6$, and the plate $C^7$, secured to the drawer and provided with a slot embracing the rod $Z^6$.

35. In a cash register and indicator, the drawer $W^6$, provided with the vertically-movable rod $M^7$, carried in suitable guides and pressed upward by a spring, in combination with a stop, such as the cross-bar $O^7$, co-operating with the rod $M^7$ to limit the outward throw of the drawer.

36. In a registering and indicating machine, the combination of the driving-shaft making one complete revolution at each operation of the machine, an indicator and register actuated thereby, the electric motor geared to the driving-shaft, an electric circuit, and means within the control of the operator for establishing the circuit through the motor to start the machine and operating automatically to break the circuit through the motor when the shaft has turned one complete revolution to stop the machine.

37. In a registering and indicating machine, the combination of the driving-shaft making one complete revolution at each operation of the machine, a register and indicator actuated thereby, the electric motor geared to the shaft, an electric circuit, and a device operated manually to establish the circuit through the motor to start the machine and operating automatically to break the circuit through the motor when the shaft has been turned one complete revolution to stop the machine.

38. In a registering and indicating machine, the combination of the driving-shaft making one complete revolution at each operation of the machine, a register and indicator actuated thereby, the electric motor geared to the shaft, the circuit for the motor, and a circuit-closer manually operated to close the circuit and start the motor and operating automatically to open the circuit and stop the motor when the shaft has been turned one complete revolution.

39. In a registering and indicating machine, the combination of the driving-shaft making one complete revolution at each operation of the machine, an indicator-wheel, means for connecting the shaft with and disconnecting it from said wheel, a series of keys co-operating with said means to determine the extent of movement imparted to the wheel by the driving-shaft, the electric motor for turning the shaft, the circuit for the motor, and means operated manually to establish the circuit through the motor to start the machine and operating automatically to break the circuit through the motor when the shaft has been turned one complete revolution to stop the machine.

40. In a registering and indicating machine, the combination of the driving-shaft making one complete revolution at each operation of the machine, an indicator-wheel, means for connecting the shaft with and disconnecting it from said wheel, a series of keys co-operating with said means to determine the point of connection of said shaft and wheel, a stationary trip for disconnecting them, the electric motor for turning the shaft, the circuit for the motor, and means operated manually to establish the circuit through the motor to start the machine and operating automatically to break the circuit through the motor when the shaft has been turned one complete revolution to stop the machine.

41. In a registering and indicating machine, the combination of a driving-shaft making one complete revolution at each operation of the machine, an oscillatory segment, an indicator-wheel geared to the latter, a latch for connecting the shaft with the segment, a series of keys co-operating with the latch to determine the extent of movement imparted to the segment by the shaft, an electric motor geared to the shaft, a circuit for the motor, and means operated manually to establish the circuit through the motor and operating automatically to break the circuit through the motor when the shaft has been turned one complete revolution.

42. In a registering and indicating machine, the combination of a driving-shaft making one complete revolution at each operation of the machine, an oscillatory segment, an indicator-wheel geared to the latter, a latch for connecting the shaft with the segment, a series of keys co-operating with the latch to connect the shaft with the segment at different points, according to the position or value of the operated key, a stationary trip for disconnecting the shaft and segment, an electric motor geared to the shaft, a circuit for the motor, and means within the control of the operator for establishing the circuit through the motor and operating automatically to break the circuit through the motor when the shaft has been turned one complete revolution.

43. In a registering and indicating machine, the combination of the driving-shaft, a register and indicator actuated thereby, the electric motor, the circuit for the motor, the circuit-closer, and means for positively starting the driving-shaft simultaneously with closing the circuit to start the motor.

44. In a registering and indicating machine, the combination of the driving-shaft, a register and indicator actuated thereby, the electric motor, the circuit for the motor, the circuit-closer, and a lever for closing the circuit and starting the driving-shaft by the same movement.

45. In a registering and indicating machine, the combination of the driving-shaft, a register and indicator actuated thereby, the electric motor, the stationary and movable contacts interposed in the circuit, a notched rim revoluble with the driving-shaft, and a device interposed between the movable contact and the rim and adapted to travel upon the periphery of the rim to hold the circuit closed and to enter the notch therein to permit the circuit to be opened.

46. In a registering and indicating machine, the combination of the driving-shaft, a register and indicator actuated thereby, the electric motor, the circuit for the motor, the stationary and movable contacts interposed in the circuit, a notched rim fast upon the driving-shaft, and a lever co-operating with said rim and movable contact and provided with a projection adapted to travel upon the periphery of the rim to hold the circuit closed and to enter the notch therein to permit the circuit to open.

47. In a registering and indicating machine, the combination of the driving-shaft, a register and indicator actuated thereby, the gear-wheel fast thereon, the notched rim, the electric motor, the circuit for the motor, the stationary and movable contacts interposed in the circuit, and the lever co-operating with the notched rim and the movable contact to close and open the circuit and with a pin upon the gear-wheel to start the latter by the act of closing the circuit.

48. In a registering and indicating machine, the combination of the driving-shaft A, the register and indicator driven by said shaft, the gear-wheel $A^8$, fast thereon and provided with the pin $T^8$, the rim $B^8$, provided with the notch $Q^8$, the motor $G^8$, having its shaft $F^8$ geared to the wheel $A^8$, the circuit-wires $H^8$ $I^8$, the contact-plates $K^8$ $L^8$, interposed in the circuit, the lever $O^8$, provided with the pointed block $P^8$, co-operating with the notched rim and with the portion $U^8$, co-operating with the pin $T^8$, the rod $R^8$, connected to the lever $O^8$, and the spring $S^8$ for resetting the rod and lever.

49. In a registering and indicating machine, the combination of the money-drawer $W^6$, the driving-shaft A, and the lever $J^9$, co-operating with the drawer and with a pin upon the driving-shaft in the manner described.

50. The combination of the driving-shaft A, cylinder $W^8$, the piston therein, the piston-rod $X^8$, and the lever $Y^8$, pivoted between its ends to the frame-work and connected at one end to the rod $X^8$, and provided at its opposite end with a slot embracing the studs $Z^8$, eccentrically mounted upon the outer end of the shaft A.

51. The combination of the gong $A^9$, hammer $B^9$, spring $E^9$, adjustable rod $F^9$, driving-shaft A, and plate T, fast on said shaft and provided with pin $H^9$, co-operating with the rod $F^9$, substantially as described.

THOMAS CARNEY.

Witnesses:
EDWARD RECTOR,
G. S. WENTWORTH.